United States Patent
Igarashi et al.

(10) Patent No.: US 7,538,814 B2
(45) Date of Patent: May 26, 2009

(54) IMAGE CAPTURING APPARATUS CAPABLE OF SEARCHING FOR AN UNKNOWN EXPLANATION OF A MAIN OBJECT OF AN IMAGE, AND METHOD FOR ACCOMPLISHING THE SAME

(75) Inventors: Takashi Igarashi, Kanagawa (JP); Ayumu Isomura, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 764 days.

(21) Appl. No.: 11/059,662

(22) Filed: Feb. 17, 2005

(65) Prior Publication Data
US 2005/0189419 A1  Sep. 1, 2005

(30) Foreign Application Priority Data
Feb. 20, 2004 (JP) .............................. 2004-044296
Dec. 22, 2004 (JP) .............................. 2004-372353

(51) Int. Cl.
*H04N 5/232* (2006.01)
*H04N 5/222* (2006.01)
*H04N 5/76* (2006.01)
*G03B 3/10* (2006.01)
*G06K 9/46* (2006.01)

(52) U.S. Cl. ................. 348/349; 348/211.3; 348/231.3; 348/333.03; 396/121; 382/203

(58) Field of Classification Search .............. 348/207.1, 348/211.3, 231.3, 231.6, 333.03, 346, 349, 348/354; 396/121–124, 148; 382/305, 255, 382/199, 203, 205
See application file for complete search history.

(56) References Cited
U.S. PATENT DOCUMENTS

| | | | |
|---|---|---|---|
| 5,412,487 A * | 5/1995 | Nishimura et al. .......... 348/346 |
| 5,877,809 A * | 3/1999 | Omata et al. ................ 348/354 |
| 6,067,114 A * | 5/2000 | Omata et al. ................ 348/354 |
| 6,370,262 B1 * | 4/2002 | Kawabata .................... 396/121 |
| 6,690,883 B2 * | 2/2004 | Pelletier ................... 348/231.3 |
| 6,765,618 B1 * | 7/2004 | Sato .......................... 348/356 |
| 7,053,953 B2 * | 5/2006 | Belz et al. .............. 348/333.02 |
| 7,071,985 B1 * | 7/2006 | Onoda et al. ................ 396/123 |
| 7,262,798 B2 * | 8/2007 | Stavely et al. .............. 348/255 |
| 7,382,405 B2 * | 6/2008 | Kusaka et al. ........... 348/231.6 |
| 2004/0125216 A1 * | 7/2004 | Keskar et al. ............ 348/211.3 |
| 2004/0135890 A1 * | 7/2004 | Kaneko et al. ........... 348/231.2 |
| 2004/0207743 A1 * | 10/2004 | Nozaki et al. .......... 348/333.12 |
| 2005/0185862 A1 * | 8/2005 | Igarashi et al. .............. 382/305 |
| 2009/0009626 A1 * | 1/2009 | Ko et al. .................. 348/231.3 |

FOREIGN PATENT DOCUMENTS

JP         03148990 A  *  6/1991
WO    WO 03/049424 A1 *  6/2003

* cited by examiner

*Primary Examiner*—John M Villecco
(74) *Attorney, Agent, or Firm*—Sughrue Mion, PLLC

(57) ABSTRACT

An image capturing apparatus includes an image capturing module for capturing an image; a display module for displaying the captured image captured by said image capturing module; a main object selecting module for selecting a main object out of the captured image; a frame display module for displaying a frame, which surrounds the main object, over the captured image on the display module. The frame display module may display a frame in the neighborhood of and around the circumference of the main object, in order to capture a high quality image easily by recognizing a main object correctly and controlling an image capturing condition on the basis of the image of the recognized main object.

19 Claims, 26 Drawing Sheets

| | | | | | |
|---|---|---|---|---|---|
| 1 | 2 | 2 | 2 | 2 | 1 |
| 2 | 2 | 3 | 3 | 2 | 2 |
| 2 | 3 | 4 | 4 | 3 | 2 |
| 2 | 3 | 4 | 4 | 3 | 2 |
| 2 | 2 | 3 | 3 | 2 | 2 |
| 1 | 2 | 2 | 2 | 2 | 1 |

| EXPLANATION | | FEATURE | |
|---|---|---|---|
| NAME | COMMENT | KIND | QUANTITY OF FEATURE |
| ⋮ | ⋮ | ⋮ | ⋮ |
| EASTERN LILY | IT IS A REPRESENTATIVE SPECIES OF LILY. ⋮ | COLOR | WHITE |
| | | CONTOUR SHAPE OF FLOWER |  |
| ⋮ | ⋮ | ⋮ | ⋮ |

~226

| EXPLANATION | | FEATURE | |
|---|---|---|---|
| NAME | COMMENT | KIND | QUANTITY OF FEATURE |
| ⋮ | ⋮ | ⋮ | ⋮ |
| EASTERN LILY | IT IS A PLANT WHICH BELONGS TO THE LILY FAMILY AND THE LILIUM GENUS. ⋮ | THE NUMBER OF PETAL | 6 |
| | | THE NUMBER OF STAMEN | 6 |
| ⋮ | ⋮ | ⋮ | ⋮ |

~228

| NAME | EXPLANATION | | FEATURE OF OBJECT DIFFERENT FROM MAIN OBJECT | |
|---|---|---|---|---|
| | COMMENT | ... | KIND | QUANTITY OF FEATURE |
| ... | ... | ... | ... | ... |
| EASTERN LILY | IT IS A REPRESENTATIVE SPECIES OF LILY. | ... | COLOR OF GROUND | DEEP BROWN |
| ... | ... | ... | ... | ... |

| EXPLANATION | | ANNEXED INFORMATION | |
|---|---|---|---|
| NAME | COMMENT | KIND | CONTENT |
| ... | ... | ... | ... |
| EASTERN LILY | IT IS A REPRESENTATIVE SPECIES OF LILY. | DATE AND TIME RANGE OF TAKING IMAGE | JUNE 1ST TO NOVEMBER 31ST |
| ... | ... | ... | ... |

38

| NUMBER | TOTAL NUMBER OF NAMES | CANDIDATE NAME |
|---|---|---|
| A | 100 | LILY, ROSE |
| B | 200 | ROSE, WATER LILY, TULIP |
| C | 300 | LILY, WATER LILY |

FIG. 18A

| CANDIDATE NAME | TOTAL SUM OF INDEX VALUE | TOTAL SUM OF ADJUSTED INDEX VALUE |
|---|---|---|
| LILY | $\frac{100}{2} + \frac{300}{2} = 200$ | 200 |
| ROSE | $\frac{100}{2} + \frac{200}{3} = 116$ | 116 |
| WATER LILY | $\frac{200}{3} + \frac{300}{2} = 216$ | 166 |
| TULIP | $\frac{200}{3} = 66$ | 66 |

FIG. 18B

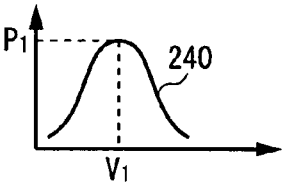
*FIG. 21A*
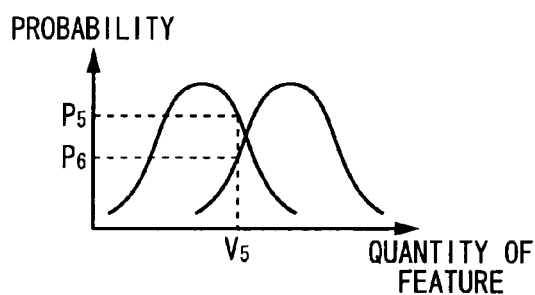
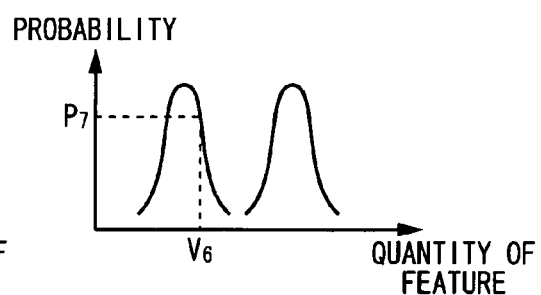
*FIG. 21B*  *FIG. 21C*

IMAGE CAPTURING APPARATUS CAPABLE OF SEARCHING FOR AN UNKNOWN EXPLANATION OF A MAIN OBJECT OF AN IMAGE, AND METHOD FOR ACCOMPLISHING THE SAME

This patent application claims priority from a Japanese patent application Nos. 2004-44296 filed on Feb. 20, 2004, and 2004-372353 filed on Dec. 22, 2004, the contents of which are incorporated herein by reference.

BACKGROUND OF THE INVENTION

1. Field of the Invention

The present invention relates to an image capturing apparatus, an image capturing method, and a machine readable medium storing thereon an image capturing program. More particularly, the present invention relates to an image capturing apparatus, an image capturing method, and a machine readable medium storing thereon an image capturing program for controlling an image capturing condition on the basis of a captured image.

2. Description of the Related Art

Conventionally, the image capturing condition is controlled on the basis of a main object, which is the most important object to the user of the image capturing apparatus such as a digital camera. For example, the focal length of the optical system of the image capturing apparatus is set to be the distance between the image capturing apparatus and the main object in order to capture the image focused on the main object. Here, as for the conventional image capturing apparatus, it is possible to capture an image focused on the main object by recognizing a thing displayed on the center of a finder as the main object, measuring the distance between the main object and the image capturing apparatus with a measuring sensor and controlling the focal length of the optical system in case the user half-presses the release button.

However, according to the conventional image capturing apparatus, in case the image is captured under a composition where the main object gets out of the center, the user must first make a focus on the main object by half-pressing the release button with the main object being on the center of the finder, adjust the facing direction of the image capturing apparatus in order for the composition of the image displayed on the finder to be the originally desired one and capture the image by full-pressing the release button.

Further, if the distance between the main object and the image capturing apparatus varies due to the movement of the main object, there is another problem that the quality of the captured image is defocused and deteriorated because the focus is not on the main object while the composition is adjusted with the release button half-pressed.

SUMMARY OF THE INVENTION

Therefore, it is an object of the present invention to provide a an image capturing apparatus, an image capturing method, and a machine readable medium storing thereon an image capturing program, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, an image capturing apparatus includes an image capturing module for capturing an image; a display module for displaying the captured image captured by said image capturing module; a main object selecting module for selecting a main object out of the captured image; a frame display module for displaying a frame, which surrounds the main object, over the captured image on the display module. The frame display module may display a frame in the neighborhood of and around the circumference of the main object.

The image capturing module may include an optical system being able to vary a focal length which is a distance from said image capturing apparatus to a focused object, the main object selecting module comprises: a repeatedly capturing module for capturing the image repeatedly while said optical system varies the focal length; a focal length acquiring module for acquiring a focal length at which a best focused image can be captured for each region comprised in the image on the basis of the image captured by said repeatedly capturing module;

a main object distance acquiring module for acquiring a main object distance, which is a distance to the main object, on the basis of each focal length of each region acquired by the focal length acquiring module; and a region selecting module for selecting a region apart by the main object distance in the image, and the frame display module may display a frame which surrounds the region selected by the region selecting module.

The main object distance acquiring module may acquire a focal length for which a value of a sum multiplied by a distance weight of each focal length is the biggest as the main object distance, the sum having a value of a sum of areas of regions having the same focal lengths multiplied by predetermined weights of regions, respectively. The image capturing apparatus may further include a variation operation module for varying the main object distance, wherein the region selection module may select again a region apart by the varied main object distance in case the main object distance is varied, and the frame display module may display a frame surrounding the region selected again by the region selecting module.

The image capturing apparatus may further include an automatic focusing module for focusing on a point at the main object distance varied by the variation operation module. The image capturing apparatus may further include an exposure selecting module for selecting a degree of exposure of the image with a larger weight on a region selected by the region selecting module than other region. The image capturing apparatus may further include a white balance setting module for setting a white balance of the image with a larger weight on a region selected by said region selecting module than other region.

The image capturing apparatus may further include a feature extracting module for extracting a feature of the main object; and an explanation searching module for searching for an explanation of the main object by using the feature extracted by the feature extracting module from the image database storing the explanation of the object corresponded to the feature of the object. The image capturing apparatus may further include a second feature extracting module for extracting a feature of an object other than the main object out of the image, wherein the explanation searching module may search for the explanation of the main object by further using the feature of the object other than the main object extracted by the second feature extracting module in the image database storing the explanation of the object further corresponded to the feature of a thing related highly to the object. The second feature extracting module may extract the feature of the object from the image captured at the focal length of the region, in which the object is comprised, acquired by said focal length acquiring module out of the plurality of images captured repeatedly by the repeatedly capturing module while varying the focal length, in case the feature of the object other than the main object is extracted.

The image capturing apparatus may further include annexed information acquiring module for acquiring annexed information annexed to the image, wherein the explanation searching module may search for the explanation of the main object by further using the annexed information gotten by said annexed information acquiring module from the image database storing the explanation of the object further corresponded to the annexed information annexed to the object. The main object distance acquiring module may acquire the main object distance on the further basis of a determination result on whether or not the same kind of feature stored in the image database is comprised in each region included in the image. The focal length acquiring module may control a division method for dividing the image into a plurality of regions on the basis of the image capturing mode predetermined by a user.

According to the second aspect of the present invention, an image capturing method by an image capturing apparatus includes an image capturing step of capturing an image; a display step of displaying the captured image captured by the image capturing step; a main object selecting step of selecting a main object out of the captured image; a frame display step of displaying a frame, which surrounds the main object, over the captured image. The image capturing step may include an optical step of being able to vary a focal length which is a distance from said image capturing apparatus to a focused object, the main object selecting step may include a repeatedly capturing step of capturing the image repeatedly while the focal length varies in the optical step; a focal length acquiring step of acquiring a focal length at which a best focused image can be captured for each region comprised in the image on the basis of the image captured by the repeatedly capturing step; a main object distance acquiring step of acquiring a main object distance, which is a distance to the main object, on the basis of each focal length of each region acquired by the focal length acquiring step; and a region selecting step of selecting a region apart by the main object distance in the image, and a frame, which surrounds the region selected by the region selecting module, is displayed during the frame display step. During the main object distance acquiring step, a focal length for which a value of a sum multiplied by a distance weight of each focal length is the biggest as the main object distance, the sum having a value of a sum of areas of regions having the same focal lengths multiplied by predetermined weights of regions, respectively, may be acquired.

According to the third aspect of the present invention, a machine readable medium storing thereon an image capturing program making an image capturing apparatus perform image capturing operation, the image capturing apparatus includes an image capturing module for capturing an image; a display module for displaying the captured image captured by the image capturing module; a main object selecting module for selecting a main object out of the captured image; a frame display module for displaying a frame, which surrounds the main object, over the captured image on the display module. The image capturing module may include an optical system being able to vary a focal length which is a distance from said image capturing module to a focused object, the main object selecting module may include a repeatedly capturing module for capturing the image repeatedly while said optical system varies the focal length; a focal length acquiring module for acquiring a focal length at which a best focused image can be captured for each region included in the image on the basis of the image captured by the repeatedly capturing module; a main object distance acquiring module for acquiring a main object distance, which is a distance to the main object, on the basis of each focal length of each region acquired by the focal length acquiring module; and a region selecting module for selecting a region apart by the main object distance in the image, and the frame display module may display a frame which surrounds the region selected by the region selecting module. The main object distance acquiring module may acquire a focal length for which a value of a sum multiplied by a distance weight of each focal length is the biggest as the main object distance, the sum having a value of a sum of areas of regions having the same focal lengths multiplied by predetermined weights of regions, respectively.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 14 shows a second example of the image database 38 according to the embodiment of the present invention.

FIG. 15 shows a third example of the image database 38 according to the embodiment of the present invention.

FIGS. 18A and 18B show an example of the process by the name determining unit 360 according to the embodiment of the present invention.

FIGS. 21A-21C show an example of certainty distributions of features stored in the image database 38 according to the embodiment of the present invention.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
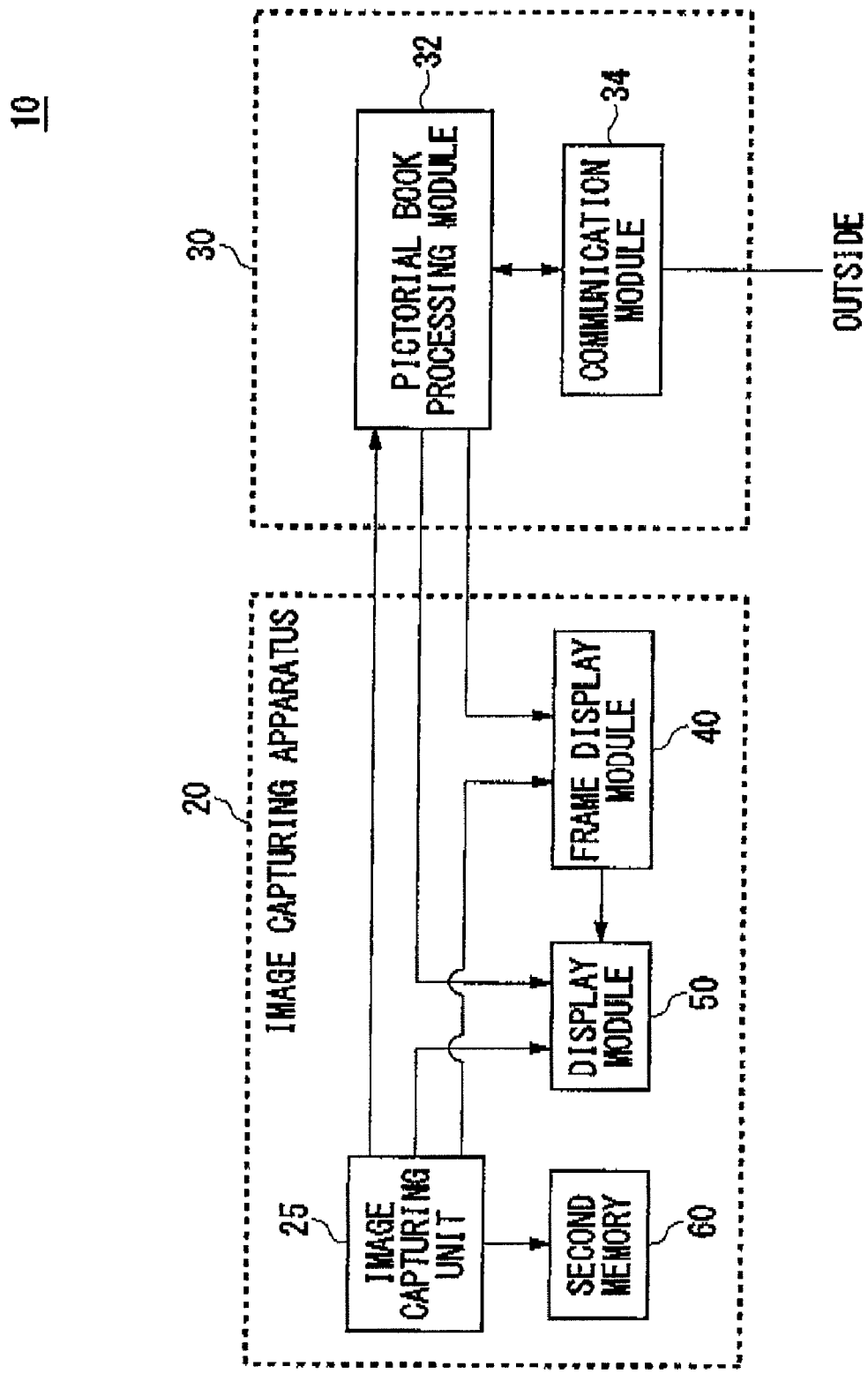
FIG. 1 is a block diagram exemplary showing the configuration of a digital pictorial book system 10 according to an embodiment of the present invention.

FIG. 1 is a block diagram to show an example of the configuration of a digital pictorial book system 10 according to an embodiment of the present invention. The digital pictorial book system 10 includes an image capturing apparatus 20 for capturing an image of an object and selecting a main object of the image, a pictorial book processing module 32 for searching for an explanation on the object on the basis of the captured image of the object, and a communication module 34 for exchanging information with the outside. The image capturing apparatus 20 includes an image capturing unit 25, a display module 50, such as an LCD monitor, for displaying and providing the captured image and the explanation on the object to a user, a frame display module 40 for displaying a frame surrounding, for example, the main object, etc., on the display module 50 so that the frame is superimposed on the captured image, and a second memory for storing the captured image, for example, a non-volatile memory such as a flash memory. The image capturing apparatus may be a digital still camera for taking still pictures or a digital video camera for taking moving pictures.

The digital pictorial book system 10 according to the embodiment of the present invention may be set by an operation mode changing switch operated by the user, which is not shown, so that its operation mode can be switched into a "digital pictorial book mode" in which the digital pictorial book system 10 functions as a digital pictorial book for searching for the information on the object captured by the image capturing apparatus 20 and providing the user with the information and "a digital camera mode" in which the digital pictorial book system 10 functions as the so-called conventional digital camera for displaying the object's image captured by the image capturing apparatus 20 by the display module 50 and storing the image in the second memory 60.

Figure 2:
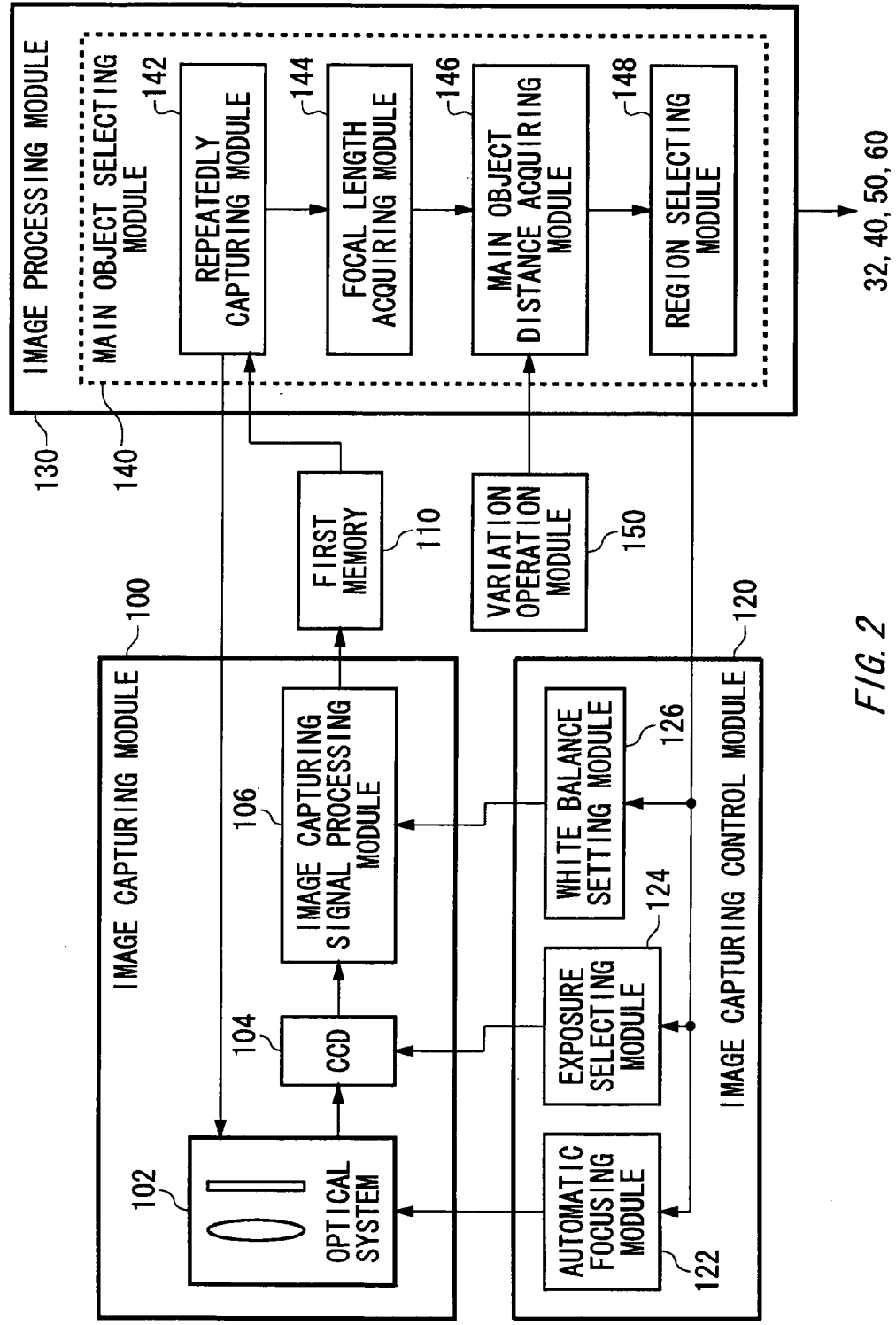
FIG. 2 is a block diagram exemplary showing the configuration of an image capturing unit 25 according to the embodiment of the present invention.

FIG. 2 is a block diagram to show an example of the configuration of the image capturing unit 25 according to the embodiment of the present invention. The image capturing unit 25 includes an image capturing module 100, a first memory 110, an image capture controlling module 120, an image processing module 130, and a variation operation module 150.

The image capturing apparatus 20 according to the present embodiment recognizes a main object from the image captured by the image capturing module 100. It is an object of the image capturing apparatus 20 to capture an image, which the user desires to obtain, easily and with a good quality by controlling the image processing based on the image of the recognized main object and displaying the recognized main object which is surrounded by a frame to deliver to the user.

Further, in case the mode of the digital pictorial book system 10 is the "digital pictorial book mode," it is an object to execute the search efficiently and precisely by automatically recognizing the main object on which information is to be searched out.

The image capturing module 100 includes an optical system 102, a CCD 104, and a capturing signal processing module 106, and captures the image of the object. The optical system 102 includes, for example, a focus lens, a zoom lens, and the like, and forms an image of the object on a light receiving surface of the CCD 104. Further, the optical system 102 can vary a focal length that is a distance from the image capturing apparatus 20 to the focused object by, for example, moving the focus lens. The CCD 104 includes a plurality of light receiving elements and outputs electric charges, which are accumulated on each of the light receiving elements due to the object's optical image formed on the light receiving surface by the optical system 102, as a voltage signal to the capturing signal processing module 106. Further, the CCD 104 can control a degree of exposure by controlling the time taken for the electric charges to be accumulated on each of the light receiving elements.

The capturing signal processing module 106 decomposes the analog voltage signal, which shows the object and is received from the CCD 104, into R, G, and B components. Then, the capturing signal processing module 106 regulates white balance of the object by regulating each of the R, G, and B components. Further, the capturing signal processing module 106 may execute a process such as gamma correction. Then, the capturing signal processing module 106 converts the analog signal decomposed into the R, G, and B components into a digital signal and outputs the acquired digital image data showing the object to the first memory 110. The first memory 110 is a volatile memory such as a DRAM and stores the digital image data output from the capturing signal processing module 106.

The image capture controlling module 120 controls the image showing the object by driving a mechanical element included in the image capturing module 100. The image capture controlling module 120 includes an automatic focusing module 122, an exposure selecting module 124, and a white balance setting module 126. The automatic focusing module 122 controls the focal length of the optical system 102. For example, the automatic focusing module 122 controls the focal length of the optical system 102 by driving the focus lens using a stepping motor.

The exposure selecting module 124 controls the degree to which the object is exposed. Specifically, the exposure selecting module 124 controls the degree of exposure by controlling the time taken for electric charges to be accumulated on the light receiving elements included in the CCD 104. Instead, the selecting module 124 may control the degree of exposure by controlling a mechanical shutter included in the image capturing module 100, which is not shown. The white balance setting module 126 sets white balance of the image showing the object for the image capturing module. Specifically, the white balance setting module 126 sets the white balance by controlling the regulating process of the R, G, and B components for the capturing signal processing module 106. Further, the image capture controlling module 120 may control zoom and stop operations of the image capturing module 100.

The image processing module 130 processes the digital image data stored in the first memory 110 and outputs the processed result to the display module 50 and the second memory 60. Alternatively, in case the operation mode of the digital pictorial book system 10 is the "digital pictorial book mode," the image processing module 130 outputs the processed result to the pictorial book processing module. In this case, the imaged at a process is, for example, a data compression process such as an YC converting process, JPEG (Joint Photographic Coding Experts Group), and the like, and a process of converting to video signal such as NTSC, PAL, and the like. Further, the image processing module 130 includes a main object selecting module 140.

The main object selecting module 140 selects the main object out of the images captured by the image capturing module 100 and received from the capturing signal processing module 106. The main object selecting module 140 includes a repeatedly capturing module 142, a focal length acquiring module 144, and a region selecting module 148. The repeatedly capturing module 142 makes the optical system 102 vary the focal length and capture the images repeatedly, receives the captured images from the capturing signal processing module 106, and outputs the received images to the focal length acquiring module 144. The focal length acquiring module 144 acquires the focal length at which an image can be acquired, each of the regions included in the image being best focused, on the basis of the images captured by the repeatedly capturing module 142, and outputs the acquired result to the main object distance acquiring module 146.

The main object distance acquiring module 146 acquires a main object distance that is a distance to the main object on the basis of the focal length acquired by the focal length acquiring module 144, and outputs the acquired result to the region selecting module 148. The region selecting module 148 selects the region which is apart by the main object distance from the captured image as the main object. Then, the region selecting module 148 outputs information on the selected region to the frame display module 40, the automatic focusing module 122, the exposure selecting module, and the white balance setting module 126. Further, in case that the operation mode of the digital pictorial book system 10 is the "digital pictorial book mode," the region selecting module 148 outputs the information on the selected region to the pictorial book processing module 32.

The frame display module 40 shown in FIG. 1 displays the frame surrounding the main object selected by the main object selecting module 140 on the display module 50 so that the frame is superimposed on the image captured by the image capturing module 100. Specifically, the frame display module 40 displays the frame surrounding the region selected by the region selecting module 148 on the display module 50. The variation operation module 150 varies the main object distance to be output from the main object distance acquiring module 146 on the basis of the operation by the user of the image capturing apparatus 20.

According to the image capturing apparatus 20 of the present embodiment, it is possible to automatically recognize the main object from the image captured by the image capturing module 100. Further, it is possible to easily inform the user of the result of the recognition by displaying the frame surrounding the recognized main object.

Figure 3:
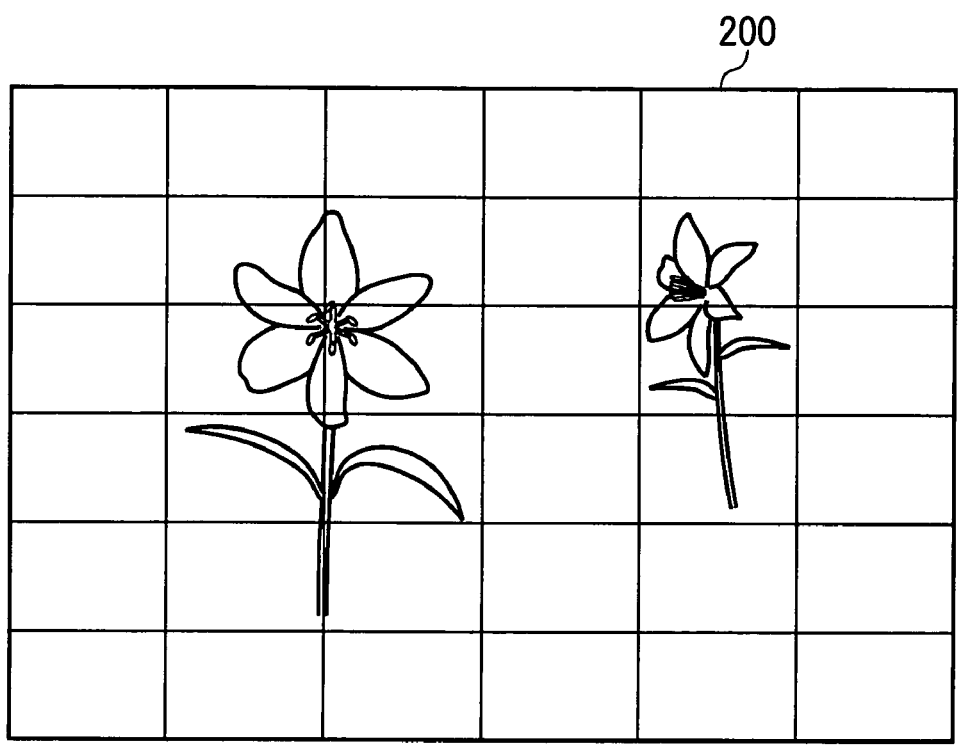
FIG. 3 shows an example of the process by a focal length acquiring module 144 according to the embodiment of the present invention.

FIG. 3 shows an example of the process by the focal length acquiring module 144 according to the present embodiment. The focal length acquiring module 144 divides the image captured by the image capturing module 100 into a plurality of regions. For example, the focal length acquiring module 144 divides a captured image 200 into six rectangles in the horizontal direction and into six rectangles in the vertical direction. Alternatively, the focal length acquiring module 144 may divide the captured image 200 into a plurality of regions having different shapes and areas from each other. In this case, the focal length acquiring module 144 can acquire precisely the focal length by dividing the captured image 200 into smaller regions, for example, near the center in which the probability of existence of the main object is high, while suppressing the load of the process, in comparison with dividing the entire of the captured image 200 into small regions uniformly.

Further, the focal length acquiring module 144 may control the method for dividing the captured image into a plurality of regions on the basis of an image-capturing mode of the image capturing apparatus 20 determined previously by the user. Here, the method for dividing indicates, for example, the number of the regions, the size and the shape of each of the divided regions, and the like. By controlling the method for dividing the captured image on the basis of the image-capturing mode like this, in case of selecting a portrait mode as the image-capturing mode, it is possible to decrease the number of the regions and the time taken to acquire the focal length in comparison with selecting a conventional image-capturing mode. Further, in case of selecting a mode of taking image at wider angle than the conventional image-capturing mode, it is possible to improve precision of focal length acquirement by increasing the number of regions.

The focal length acquiring module 144 detects the degree of focusing of a partial image for each of the plurality of divided regions. For example, the focal length acquiring module 144 decomposes the image signal of each region into a plurality of frequency components by fast Fourier transform (FFT) and the like, and detects the level of a high frequency component for each region as the degree of focusing. Then, the focal length acquiring module 144 detects an image, in which the degree of focusing is highest at a certain region, out of the images captured for the plurality of focal lengths by the repeatedly capturing module 142 and acquires the distance at which the image is captured as the focal length of the region.

As above, according to the image capturing apparatus 20 of the present embodiment, it is possible to acquire the focal length for each of the regions in the captured image with a high precision.

Figures 4A, 4B:
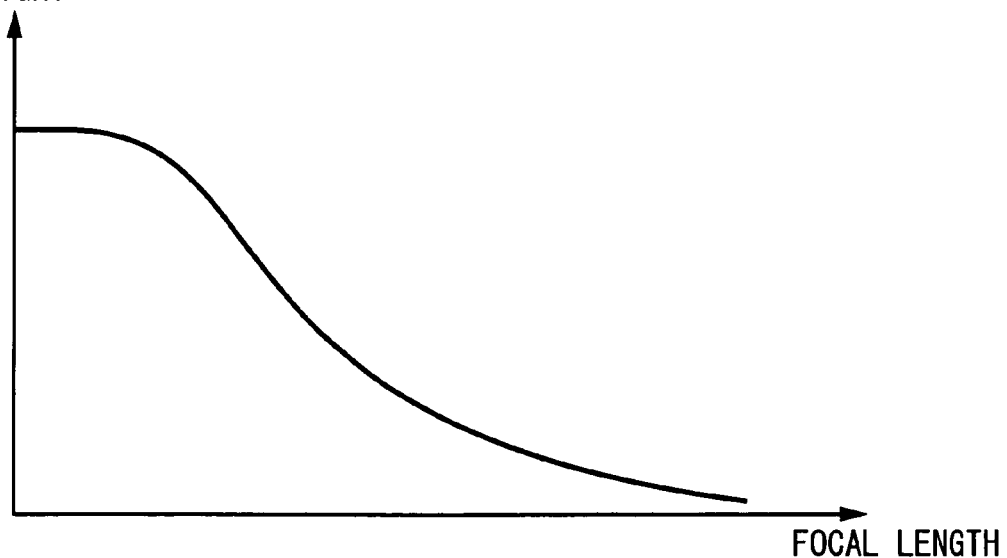
FIGS. 4A and 4B an example of weighting used by a main object distance acquiring module 146 according to the embodiment of the present invention.

FIG. 4 shows an example of weighting used by the main object distance acquiring module 146 according to the present embodiment. FIG. 4A shows an example of predetermined weighting for each region of an image captured by the image capturing module 100. The main object distance acquiring module 146 acquires the sum of products of the area of each of the regions having the same focal lengths and the predetermined weight of each region. Specifically, the main object distance acquiring module 146 detects the plurality of regions having the same focal lengths as an object existing at the focal length on the basis of the focal length of each region acquired by the focal length acquiring module 144. Then, for each of the plurality of regions, the main object distance acquiring module 146 acquires a product of an area of the region and the predetermined weight at the region, for example, shown in FIG. 4A. The main object distance acquiring module 146 acquires the sum of the products acquired for the plurality of regions as weight of the object existing at the focal length.

In FIG. 4A, the weight of each region at the central portion of the image is higher than the weight of each region around the image. That is because a composition of putting a main object at the central portion of an image is widely used. The weight is shown in the present figure as an example and not limited to the description on the present figure. For example, the weight is not constant generally and may vary according to the capturing condition. Specifically, in case the image-capturing mode of the image capturing apparatus 20 is the portrait mode, the weight at the central portion of the image may become larger than that of FIG. 4A.

FIG. 4B shows an example of relationship between the distance weight and the focal length of the image captured by the image capturing module 100. The main object distance acquiring module 146 acquires a value of the sum of the weight at the plurality of regions having the same focal lengths acquired beforehand multiplied by the distance weight for the focal length, which is, for example, obtained from FIG. 4B. Then, the main object distance acquiring module 146 acquires the focal length, at which the acquired value is the largest, as the main object distance.

According to FIG. 4B, the distance weight becomes smaller as the focal length becomes larger. That is because the main object is generally put the nearer to the image capturing apparatus 20. The distance weight is shown in the present figure as an example and not limited to the description on the present figure. For example, the weight is not constant generally and may vary according to the capturing condition. Specifically, in case the image-capturing mode of the image capturing apparatus 20 is the macro mode, the degree of decrease in the distance weight according to the increase in the focal length may become larger. Further, the distance weight at a typical focal length of any image-capturing mode may be made to be the largest.

According to the image capturing apparatus 20 of the present embodiment, it is possible to recognize the main object with a high precision by acquiring the main object distance making use of the weight at each region and each focal length.

Figure 5A:
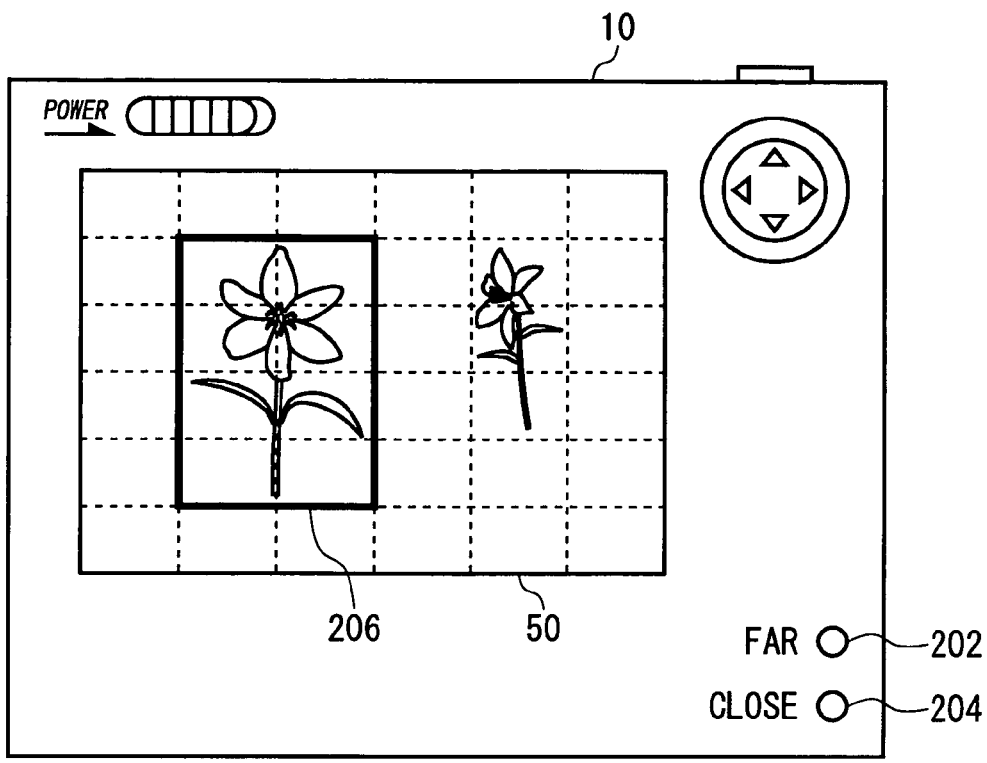
FIGS. 5A and 5B show an example of the exterior of the digital pictorial book system 10 according to the embodiment of the present invention.

FIG. 5 shows an example of the exterior of the digital pictorial book system 10 according to the embodiment of the present invention. FIG. 5A shows an example of the exterior of the digital pictorial book system 10 at a point of time. The pictorial book system 10 shown in FIG. 5A includes a long distance button 202 and a short distance button 204. The long distance button 202 and the short distance button 204 are an example of the variation operation module 150.

The region selecting module 148 selects the region, which is apart by the main object distance acquired by the main object distance acquiring module 146, from the image captured by the image capturing module 100 as the main object. Then, the frame display unit 40 displays a frame 206 surrounding the region selected by the region selecting module 148 so that the frame 206 is overlapped with the captured image displayed by the display module 40. Specifically, the frame display module 40 displays the frame 206 in the neighborhood of and around the circumference of the main object. Here, the neighborhood of the circumference of the main object is not limited to the circumference of the region showing the main object itself. For example, the frame display module 40 may display the frame 206 extended to the outside by a predetermined pixel with respect to the circumference. Thus, it is possible to prevent the main object that is an important region in the captured image from coming difficult to see.

Figure 5B:
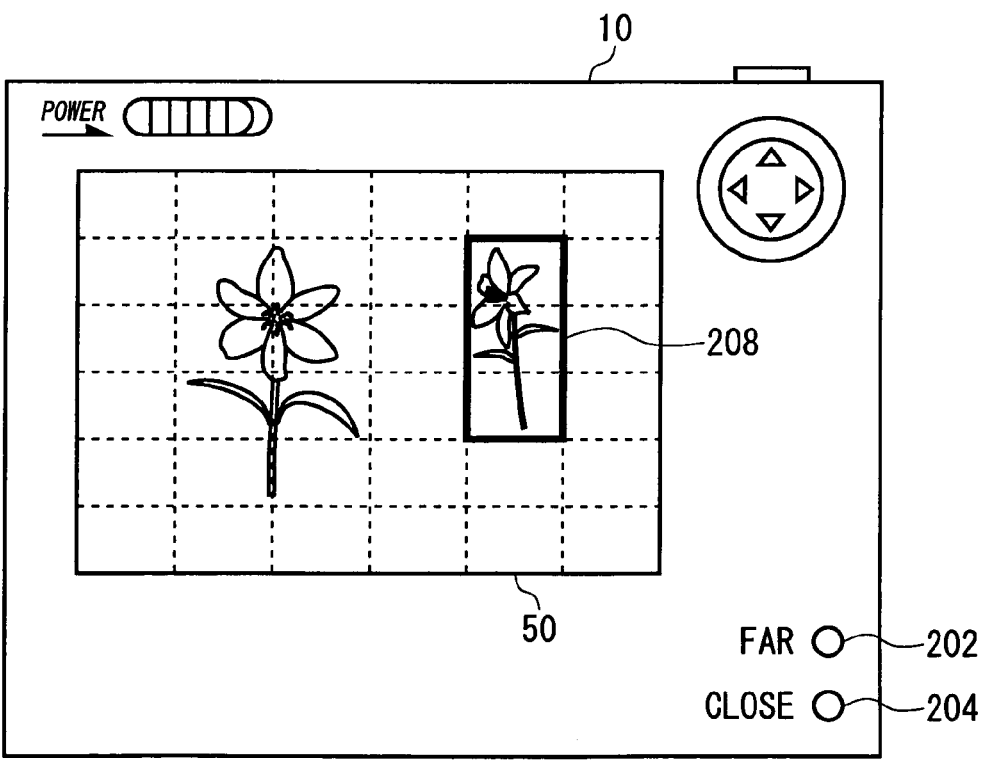

FIG. 5B shows an example of the exterior of the digital pictorial book system 10 in case the user operates the long distance button 202. In case the user pushes the long distance button 202, the long distance button 202 instructs the main object distance acquiring module 146 to vary the main object distance farther. Further, in case the user pushes the close distance button 204, the close distance button 204 instructs the main object distance acquiring module 146 to vary the main object distance more closely.

The main object distance acquiring module 146 receives the instruction, and, out of a plurality of candidates of the main object distance, which are selected on the basis of the weight of the object for each focal length, selects one candidate further away from or closer to the main object at this point in time as a new main object distance. The main object distance acquiring module 146 outputs the result to the region selecting module 148. Then, the region selecting module 148 selects the region which is apart by the new main object distance as a main object and outputs information on the region to the frame display module 40. The frame display module 40 receives the information and displays a frame 208 on the display module 50, instead of the frame 206.

According to the image pick apparatus 20 of the present embodiment, even if the automatically recognized main object is not correct, the user can execute image-capturing as intended by selecting a correct main object distance.

Further, in case of taking moving pictures by the image capturing apparatus 20, it is possible to change the main object without changing composition while taking images, by varying the main object distance making use of the variation operation module 150.

Figure 6:
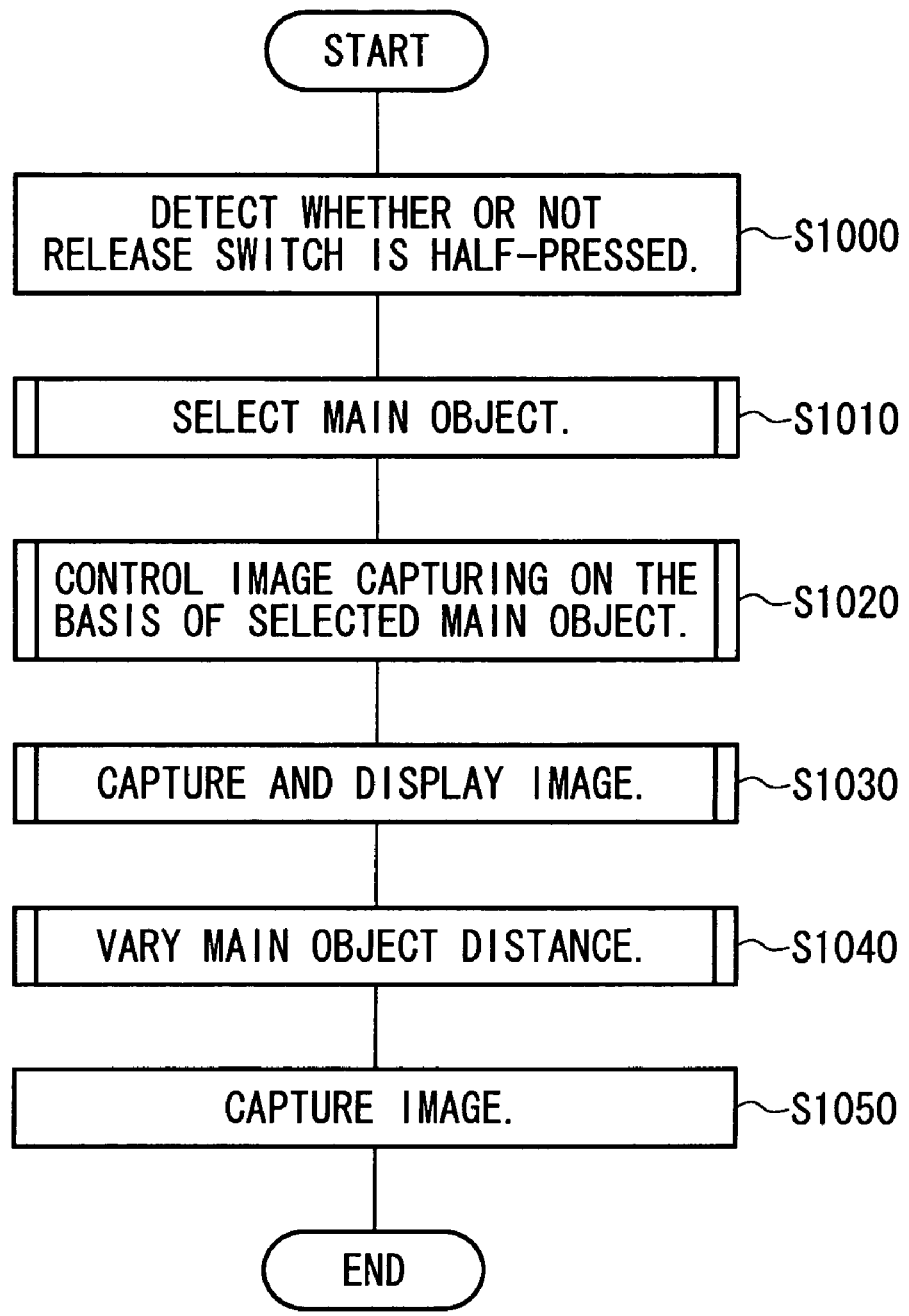
FIG. 6 is a flowchart exemplary showing the process by an image capturing apparatus 20 according to the embodiment of the present invention.

FIG. 6 is a flowchart to show an example of the process by the image capturing apparatus 20 according to the present embodiment. In case the release switch is half-pressed by the user, the image capturing apparatus 20 starts the following processes (S1000). Alternatively, the image capturing apparatus 20 may start the following processes whenever electric power is input. The image capturing apparatus captures an image of an object by the image capturing module 100 and selects a main object from the image (S1010). Then, the image capturing apparatus 20 controls the image capturing of the image capturing module 100 by the image capture controlling module 120 based on the selected main object (S1020). The image capturing apparatus 20 captures an image of the object and displays on the display module 50 (S1030).

The image capturing apparatus 20 varies the main object distance based on the operation by the user (S1040). In case the release switch is fully pressed, the image capturing apparatus 20 captures an image of the object by the image capturing module 100 and stores the captured image in the first memory 110. Then, the image capturing apparatus 20 executes an image processing such as a data compression process and stores the image data in the second memory 60 (S1050). Here, in case the operation mode of the digital pictorial book system 10 is the "digital pictorial book mode," the image capturing apparatus 20 outputs the image data and information showing the region of the selected main object to the pictorial book processing module 32, instead of storing the image data in the second memory 60.

Figure 7:
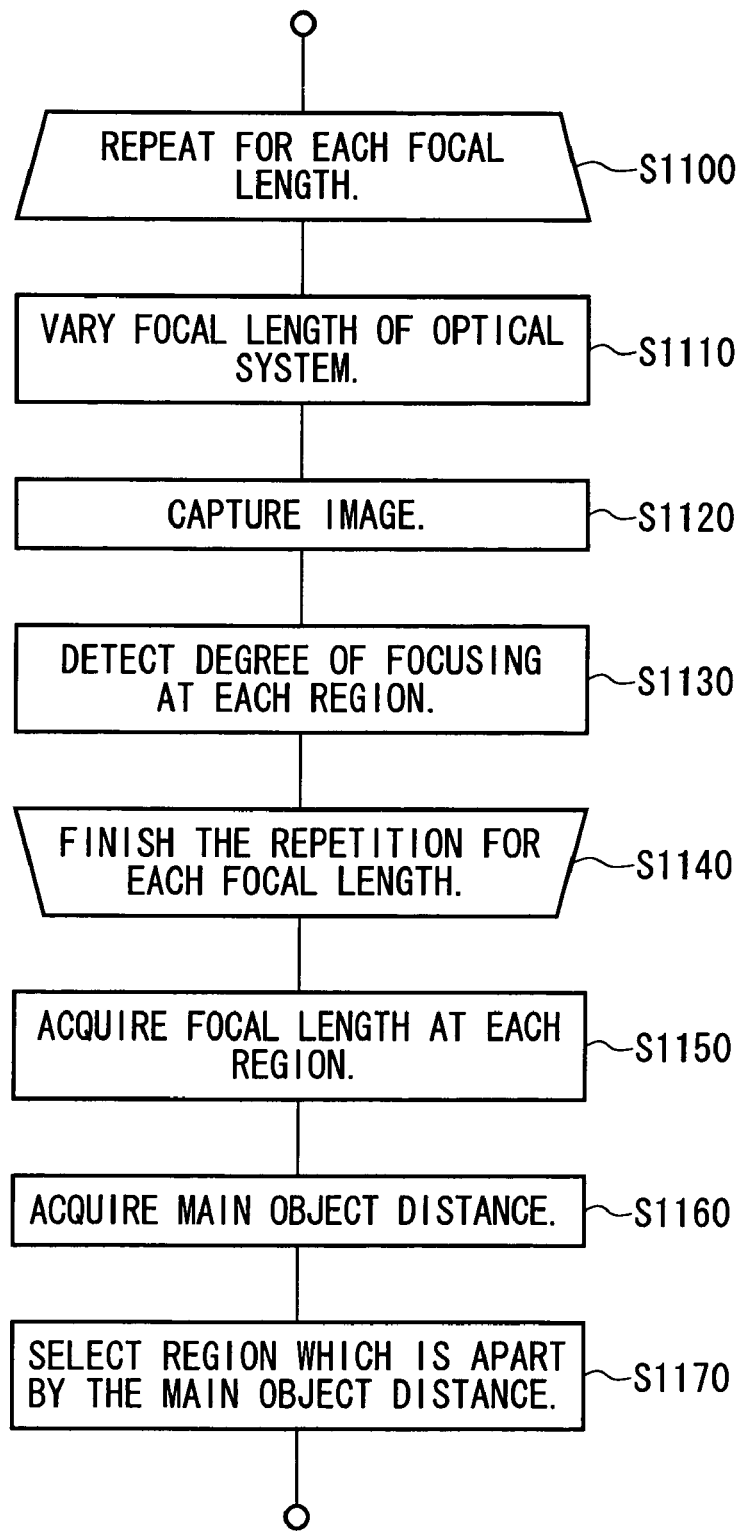
FIG. 7 is a flowchart which shows S1010 in detail.

FIG. 7 is a flowchart to show S1010 in detail. The repeatedly capturing module 142 executes the following processes for each of a plurality of predetermined focal lengths (S1100). Here, the predetermined focal lengths are selected from a focusing range of the optical system 102 and necessary for acquiring the main object distance. The focal lengths may be fixed or varied according to the image-capturing mode of the image capturing apparatus 20. For example, in case the image-capturing mode is the portrait mode, the image capturing apparatus 20 may select more focal lengths from a region near to the image capturing apparatus 20 than a region far away from the image capturing apparatus 20.

Further, the repeatedly capturing module 142 may display images of 30 frames per a second by the display module 50 and acquire the focal length by using the other images out of the images captured at a frequency higher than 30 frames per a second. Thus, it is possible to capture images at a plurality of focal lengths while displaying the images with a constant focal length to the user.

The repeatedly capturing module 142 varies the focal length of the optical system 102 (S1110). The image capturing module 100 captures an image of the object and stores the image data in the first memory 110 (S1120). The focal length acquiring module 144 divides the captured image into a plurality of regions and acquires focusing degree for each of the regions (S1130). The image capturing apparatus 20 repeats S1110 to S1130 for each of the plurality of the predetermined focal lengths (S1140).

For each of the regions, the main object distance acquiring module 146 acquires the focal length of the highest focusing degree of the plurality of focal lengths, at which the images are captured, as the focal length of the region (S1150). The main object distance acquiring module 146 detects a plurality of regions having the same focal lengths out of the regions and acquires the sum of products of the area of each region and the predetermined weight for each region. Then, the main object distance acquiring module 146 calculates the sum of the products acquired for each region. The main object distance acquiring module 146 acquires the value of multiplying the calculated sum by the weight predetermined for the corresponding focal length for each of the focal lengths. The main object distance acquiring module 146 executes the following processes for each group of the regions having the same focal lengths, selects a plurality of focal lengths in the descending order of the acquired values, and selects the focal length of the largest value as the main object focal length and the other focal lengths as candidates for the main object focal length (S1160). The region selecting module 148 detects a plurality of regions having the main object focal length as the main object (S1170).

Figure 8:
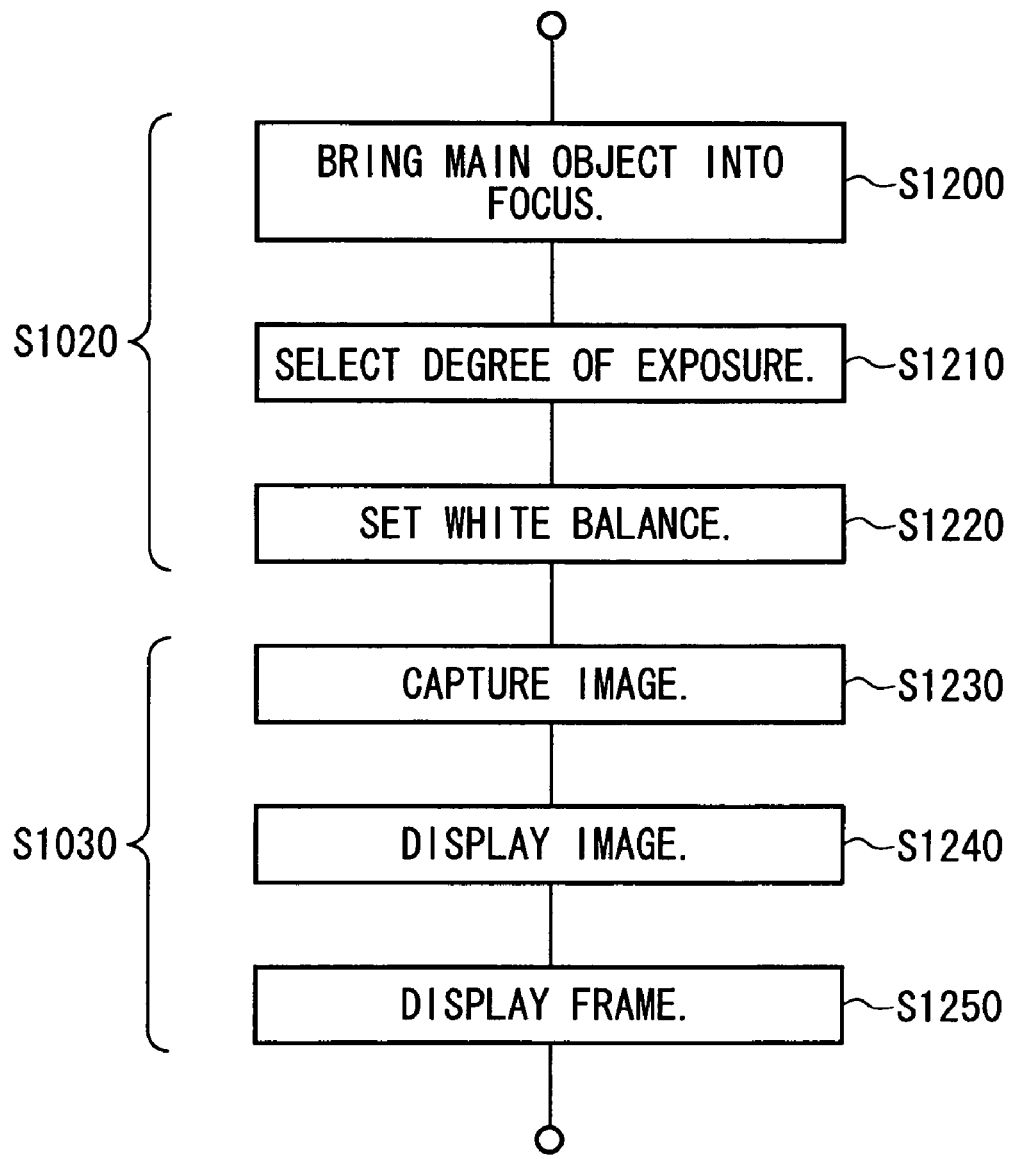
FIG. 8 is a flow chart which shows S1020 and S1030 in detail.

FIG. 8 is a flow chart to show S1020 and S1030 in detail. The automatic focusing module 122 controls the optical system 102 to bring the region selected by the region selecting module 148, that is the main object, into focus (S1200). Further, the exposure selecting module 124 selects the degree of exposure of the image which gives bigger weight to the region selected by the region selecting module 148, that is, the main object, than the other regions (S1210). Furthermore, the white balance setting module 126 sets the white balance of the image which gives bigger weight to the region selected by the region selecting module 148, that is, the main object, than the other regions (S1220).

The image capturing module 100 captures an image of the object under the capturing conditions such as the focus, the degree of exposure, and the white balance controlled on the basis of the selected main object (S1230). The display module 50 displays the captured image (S1240). The frame display module 40 displays a frame surrounding the region selected by the region selecting module 148 on the display module 50 so that the frame is overlapped with the captured image (S1250).

Figure 9:
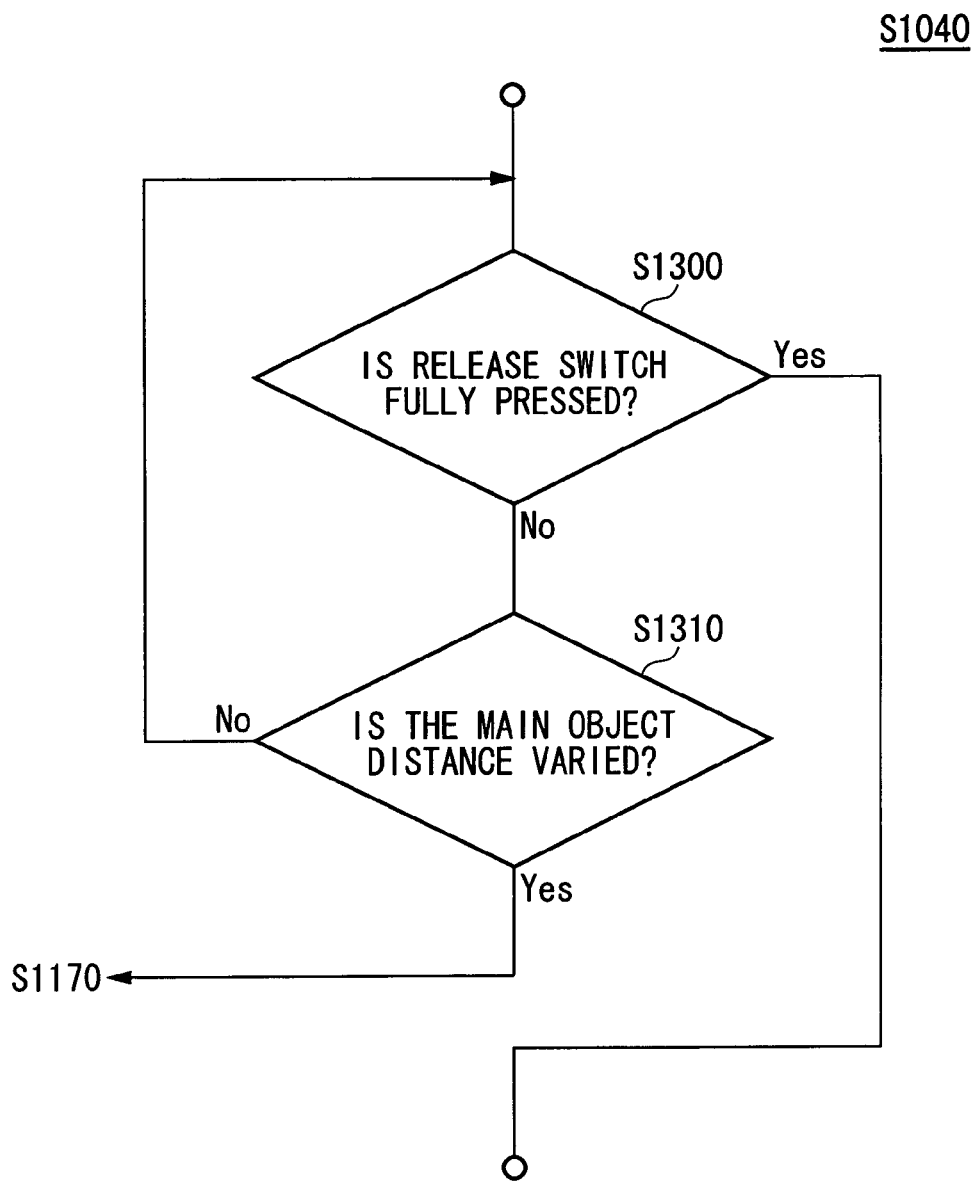
FIG. 9 is a flow chart which shows S1040 in detail.

FIG. 9 is a flow chart to show S1040 in detail. The image capturing apparatus 20 determines whether or not the release switch is fully pressed by the user (S1300). In case the release switch is not fully pressed (S1300: No), the image capturing apparatus 20 determines whether or not the main object distance is varied by the variation operation module 150 (S1310). In case the main object distance is not varied (S1310: No), the image capturing apparatus 20 returns to S1300 and determines again whether or not the release switch is fully pressed.

In case the main object distance is varied (S1310: Yes), that is, the user changes the main object distance with one of the candidates for the main object distance in the main object distance acquiring module 146 by using the variation operation module 150, the main object distance acquiring module 146 outputs the changed main object distance to the region selecting module 148. Then, the region selecting module 148 selects again the region which is apart by the changed main object distance (S1170).

The automatic focusing module 122 drives the optical system 102 so as to focus at the changed main object distance (S1200). Further, the exposure selecting module 124 selects the degree of exposure of the image which gives bigger weight to the region selected according to the changed main object distance, that is, the main object, than the other regions (S1210). Furthermore, the white balance setting module 126 sets the white balance of the image which gives bigger weight to the region selected according to the changed main object distance, that is, the main object, than the other regions (S1220).

The image capturing module 100 captures an image of the object under the capturing conditions such as the focus, the degree of exposure, and the white balance adjusted on the basis of the changed main object distance (S1230). The display module 50 displays the captured image (S1240). Further, the frame display module 40 displays a frame surrounding the region selected on the basis of the changed main object distance on the display module 50 to inform the user that the main object is changed (S1250).

On the other hand, in case the release switch is fully pressed (S1300: Yes), the image capturing apparatus 20 proceeds to S1050 and captures an image of the object.

According to the image capturing apparatus 20 of the present embodiment, it is possible to capture images, which the user desires to obtain, with a high precision by determining the capturing conditions such as the focus, the degree of exposure, and the white balance on the basis of the main object recognized by the main object selecting module 140 to control the image capturing module 100.

Figure 10:
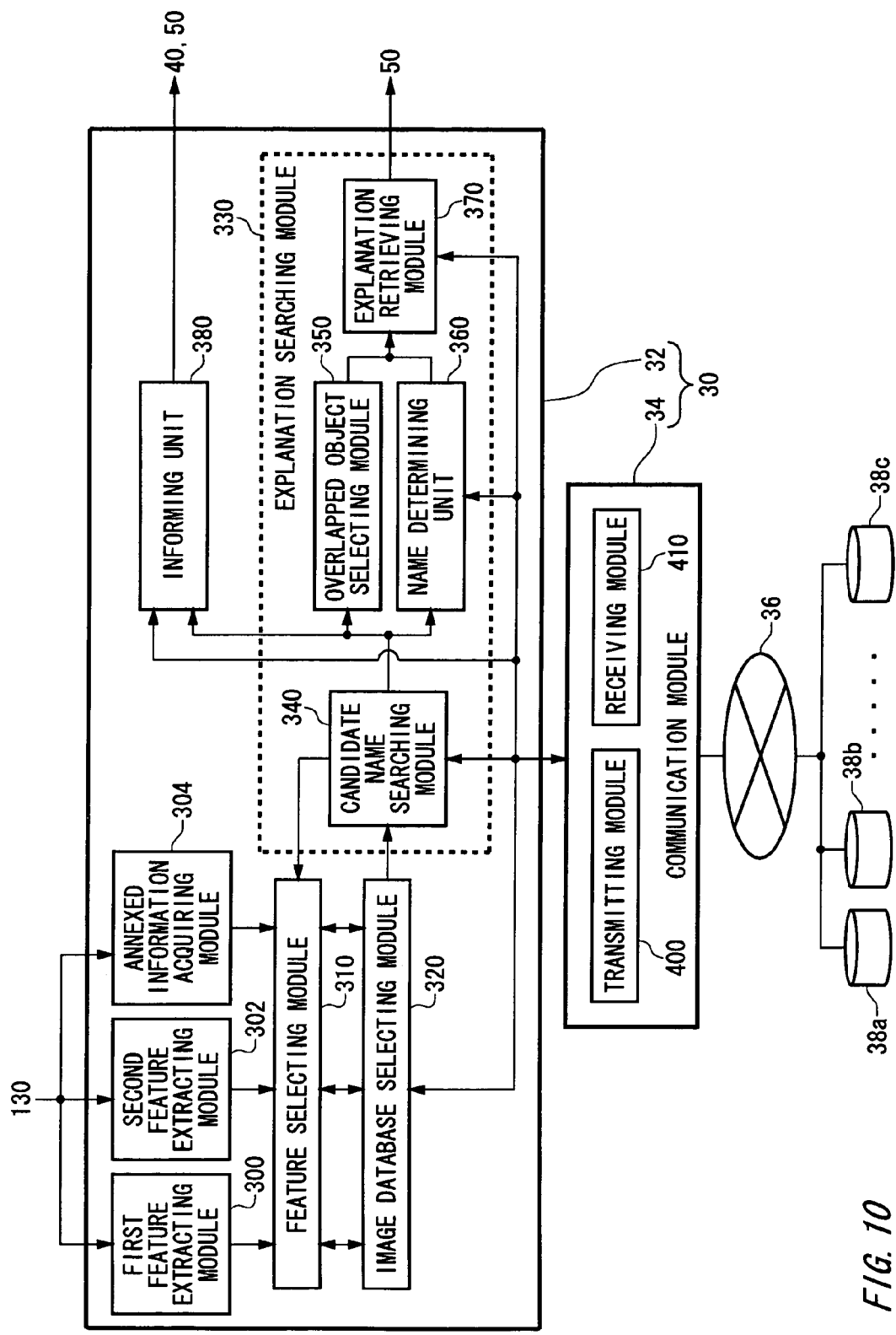
FIG. 10 is a block diagram exemplary showing a partial FIG. 30 according to an embodiment of the present invention in detail.

FIG. 10 is a block diagram to show an example of a partial FIG. 30 according to an embodiment of the present invention in detail. The pictorial book processing module 32 included in the digital pictorial book system 10 connects with a network 36. Then, the digital pictorial book system 10 searches for an explanation on the object in a plurality of databases (38*a*, 38*b*, ..., 38*c*; hereinafter, referred to 38), which stores information on the object corresponded each of a plurality of features of the object different from each other, through the network 36.

Here, the network 36 is, for example, the Internet. Further, the image database 38 may be, for example, one image database providing service or a plurality of image databases services different from each other.

It is an object of the pictorial book processing module 32 and the communication module 34 according to the present embodiment to get search result efficiently and precisely in case of searching for an explanation on the object by using a plurality of features.

The pictorial book processing module 32 includes a first feature extracting module 300, a second feature extracting module 302, an annexed information acquiring module 304, a feature selecting module 310, an image database selecting module 320, an explanation searching module 330, and an informing unit 380. The first feature acquiring module 300 receives the object's image captured by the image capturing module 100 and the region showing the main object which is selected by the main object selecting module 140 from the image processing module 130 shown in FIG. 2. Then, the first feature extracting module 300 extracts features of the main object from the received image and outputs them to the feature selecting module 310. Here, the feature of the main object is, for example, a contour shape, a digitized image, a distribution of color, and the like. The second feature extracting module 302 receives the image of the object captured by the image capturing module 100 and the region showing the main object selected by the main object selecting module 140 from the image processing module 130. Then, the second feature extracting module 302 extracts features of an object other than the main object from the received image and outputs them to the feature selecting module 310.

The annexed information acquiring module 304 obtains the object's image captured by the image capturing module 100 and information annexed to the image from the image processing module 130. Here, the annexed information may include, for example, latitude, longitude, altitude, and depth of the place where the image is captured, acquired by GPS (Global Positioning System) included in the image capturing apparatus 20. Further, the annexed information may include, for example, the capture day and/or time acquired by a calendar function of the image capturing apparatus 20 and information on a season based on the day and time. Furthermore, the annexed information may include, for example, a temperature acquired by a thermometer included in the image capturing apparatus 20. Furthermore, the annexed information may include, for example, a distance from the image capturing apparatus 20 to the main object, the size of the main object in the image, and information on the real size of the main object acquired by using an image capturing magnification of the image capturing apparatus 20 and the like. Then, the annexed information acquiring module 304 outputs the acquired annexed information to the feature selecting module 310.

The feature selecting module 310 selects a feature of a predetermined kind out of the features of all kinds extracted from the main object by the first feature extracting module 300. Then, the feature selecting module 310 outputs each of the feature of the predetermined kind and a feature not selected to the image database selecting module 320. Further, the feature selecting module 310 selects a feature of a predetermined kind out of features of all kinds extracted from an object other than the main object by the second feature extracting module 302. The feature extracting module 310 outputs each of the feature of the predetermined kind and a feature not selected to the image database selecting module 320. Further, the feature selecting module 310 selects annexed information of a predetermined kind out of annexed information of all kinds. Then, the feature selecting module 310 outputs each of the annexed information of the predetermined kind and annexed information not selected to the image database selecting module 320.

Further, the feature selecting module 310 may select features of at least a part of kinds out of the features of all the kinds as the feature of the predetermined kind or the features of another kind, instead of selecting the features of all the kinds extracted from the main object by the first feature selecting module 300 as the feature of the predetermined kind or the feature of another kind. Specifically, the feature extracting module 310 may select the feature of the predetermined kind out of the features of at least a part of kinds which are extracted based on the certainty higher than a predetermined value from the features of all the kinds extracted from the main object by the first feature extracting module 300, and select a feature of a kind other than the predetermined kind out of the features of at least a part of the kinds as a feature of another kind. Here, the probability of a feature may be a value indicating a certainty that an image showing the main object have the feature actually, for example, a value acquired by using a method predetermined according to the kind of the feature, on the basis of quality of image data used for extracting the feature and the like. For example, the maximum value of difference between adjacent pixels may be acquired as a probability of a feature showing a contour shape of the object. Consequently, in case the acquired maximum value of difference between adjacent pixels is smaller than a value predetermined by, for example, the user because the focusing degree of the captured image is not sufficiently high, it is difficult to say that the probability of the feature showing the contour shape of the object is not high and thus the feature selecting module 310 may exclude the feature showing the contour shape of the object while selecting the feature of the predetermined kind and the feature of another kind.

Further, similarly, the feature selecting module 310 may select features of a predetermined kind out of features of at least a part of kinds which are extracted based on the certainty higher than a predetermined value from the features of all the kinds extracted by the second feature extracting module 302, and select a feature of a kind other than the predetermined kind out of the features of at least a part of the kinds as a feature of another kind. Alternatively, the feature selecting module 310 may select annexed information of a predetermined kind out of annexed information of at least a part of kinds which are acquired based on the certainty higher than a predetermined value out of the annexed information of all the kinds acquired by the annexed information acquiring module 304, and select annexed information of a kind other than the predetermined kind out of the annexed information of at least a part of the kinds as annexed information of another kind.

The image database selecting module 320 selects an image database storing the feature of the kind extracted by the first feature extracting module 300 on the basis of the information received from the plurality of image databases 38 through the communication module 34 out of the plurality of image databases 38. Here, the explanation of the object may be the name of the object and comment on ecology in case the object is an animal or a plant. Further, the explanation of the object is not limited to letter information and may include various information, such as image information including a reference image of the object, data on a three-dimensional shape, habitat, altitude, and depth. The database selecting module 320 may select an image database which further stores the feature of the kind extracted by the second feature extracting module 302 for the object other than the main object out of a plurality of image databases storing explanations of objects further corresponded to features of a thing having a high relevance with the object. Further, the database selecting module 320 may select an image database which further stores the annexed information of the kind acquired by the annexed information acquiring module 304 out of a plurality of image databases storing explanations of objects further corresponded to information annexed to the captured image.

The explanation searching module 330 searches for explanation of the main object in the database 38 selected by the image database searching module 320 by using a feature extracted by the first feature extracting module 300. Further, the explanation searching module 330 may search for an explanation of the main object in the database 38 selected by the image database searching module 320 by using further a feature of an object other than the main object extracted by the second feature extracting module 302. Furthermore, the explanation searching module 330 may search for an explanation of the main object in the database 38 selected by the image database searching module 320 by using further annexed information acquired by the annexed information acquiring module 304. The explanation searching module 330 includes a candidate name searching module 340, an overlapped object selecting module 350, a name determining module 360, and an explanation reading module 370.

The candidate name searching module 340 searches for a candidate name that is a candidate for the name of the main object in each of the plurality of image databases 38 by using the features extracted by the first feature extracting module 300 and the second feature extracting module 302 and the annexed information acquired by the annexed information acquiring module 304 by communicating with the image database 38 through the communication module 34. Then, the candidate name searching module 340 outputs the result searched out to the overlapped object selecting module 350, the name determining unit 360, and the informing unit 380. Although the candidate name searching module 340 searches the candidate of the name of the main object in the present embodiment, a thing to be searched for is not limited to the candidate of the name and may be any information which makes the object distinguished. In addition to the candidate of the name of the main object, the candidate name searching module 340 may search an explanation of the object corresponding to the name.

The overlapped object selecting module 350 selects an overlapped object searched out in a plurality of image databases on the basis of the search result received from the candidate name searching module 340. Specifically, the overlapped object selecting module 350 selects an object having a name common to the plurality of image databases out of the names of a plurality of objects included in the result of searching the plurality of image databases, which is received from the candidate name searching module 340, as the overlapped object. Then, the overlapped object selecting module 350 outputs the name of the overlapped object to the explanation retrieving module 370.

The name determining unit 360 determines a most certain name as the main object on the basis of the result of searching the plurality of image databases, which is received from the candidate name searching module 340, and outputs the result to the explanation retrieving module 370. The explanation retrieving module 370 retrieves an explanation of the main object stored in at least one image database 38, on the basis of the name received from at least one of the overlapped object selecting module 350 and the name determining unit 360. Specifically, the explanation retrieving module 370 transmits the name of the main object to at least one of the image databases 38 by using the transmitting module 400, makes information of the main object searched for in each of the image databases 38, and retrieves the explanation of the main object obtained as a result by using the receiving module 410. Then, the explanation retrieving module 370 displays and provides the retrieved explanation to the user by the display module 50. The informing unit 380 informs the user which portion of an object to capture in case of further narrowing the result of searching the plurality of image databases 38 received from the candidate name searching module 340.

The communication module 34 includes the transmitting module 400 and a receiving module 410. The transmitting module 400 is connected with the plurality of image databases 38 through the network 36 and transmits information to the plurality of image databases 38 in response to request of each module of the pictorial book processing module 32. For example, the transmitting module 400 transmits the features of the main object extracted by the first feature extracting module 300 to the image databases 38 formed outside.

The receiving module 410 is connected to the plurality of image databases 38 through the network 36 and transmits the information received from the plurality of image databases 38 to each module of the pictorial book processing module 32. For example, the receiving module 410 receives the explanation of the main object searched for in the image database 38 through the network 36 and transmits the explanation to the candidate name searching module 340 or the explanation retrieving module 370. The transmitting module 400 and the receiving module 410 connects with the network 36 by a wired communication such as Ethernet (registered trademark) or a wireless communication such as LAN, Bluetooth (registered trademark), and CDMA.

According to the digital pictorial book system 10 of the embodiment of the present invention, it is possible to achieve reduction of the size and the cost of the digital pictorial book system 10 by using the image database connected through the network 36.

Further, it is possible to obtain precise search result covering a wide search range by searching various image databases connected to the Internet and the like.

Furthermore, according to the digital pictorial book of the embodiment of the present invention, it is possible to execute search by using only a feature which is certain out of the features extracted from the image. For example, in case the main object is a flower, if the number of petal and the number of stamen of the main object cannot be recognized with sufficiently high precision because capturing conditions are not sufficiently good, it is possible to search explanation of the main object by using a feature other than the number of petal and the number of stamen. Therefore, it is possible to improve precision of the search.

The configuration shown in the present figure is an example and it is possible to make various changes. For example, the pictorial book processing module 32 may not include at least one of the second feature extracting module 302 and the annexed information acquiring module 304. Further, the explanation searching module 330 may not include at least one of the overlapped object selecting module 350 and the name determining module 360. In this case, the explanation retrieving module 370 retrieves explanation of the main object from the image database 38 on the basis of the name of the main object received from the overlapped object selecting module 350 or the name determining module 360. Furthermore, the explanation searching module 330 may not include the informing unit 380.

In addition, although the pictorial book processing module 32 shown in the present figure accesses to the plurality of image databases formed outside the digital pictorial book system 10 through the communication module 32 and the network 36, the pictorial book processing module 32 may access to a plurality of image databases formed inside the digital pictorial book system 10. Thus, the pictorial book system 10 can search an explanation of the main object in case communication with the outside is impossible.

Further, the digital pictorial book system 10 can be controlled to choose which one to use of the outside image database 38 and the inside image database 38. In other words, the digital pictorial book system 10 uses the plurality of image databases 38 formed inside if communication with the outside is impossible, and otherwise use the plurality of image databases 38 formed outside otherwise. Furthermore, digital pictorial book system 10 can use both the outside image database 38 and the inside image database 38 at the same time. As described above, it is possible to search an explanation of the main object efficiently by changing flexibly the configuration of the image database to be used according to purposes and conditions of utilization.

Figure 11:
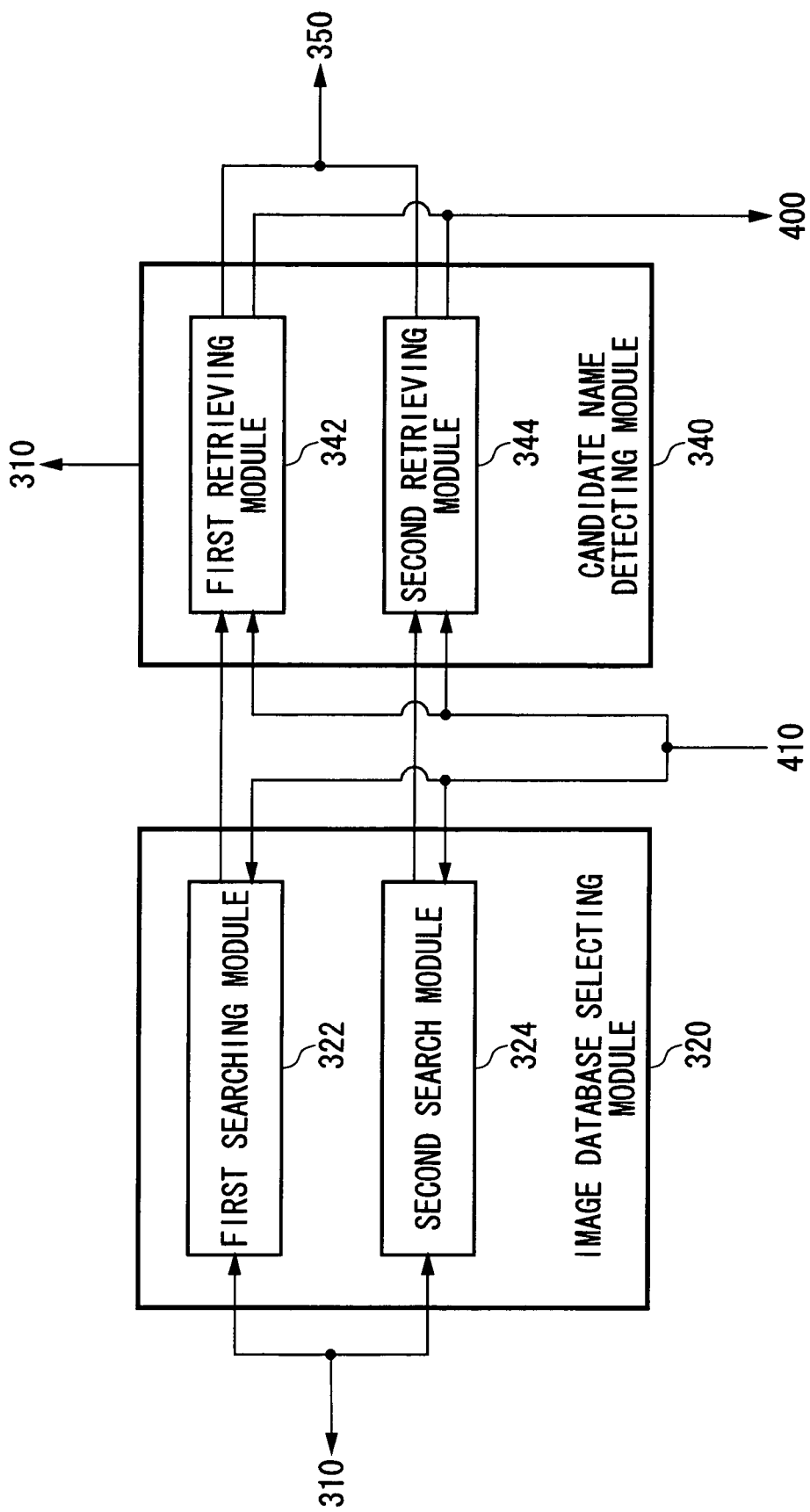
FIG. 11 is a block diagram which shows an image database selecting module 320 and a candidate name searching module 340 according to the embodiment of the present invention in detail.

FIG. 11 is a block diagram to show the image database selecting module 320 and the candidate name searching module 340 according to the present embodiment in detail. The image database selecting module 320 includes a first image database selecting module 322 and a second image database selecting module 324. The first image database selecting module 322 receives information of the image database 38, for example, a kind of feature stored in each of the plurality of image databases 38, through the network 36 by using the receiving module 410. On the basis of the information, the first image database selecting module 322 selects a first image database storing the feature of the predetermined kind selected by the feature selecting module 310 out of the features extracted by the first feature extracting module 300. Then, the first image database selecting module 322 outputs information showing the first image database to the candidate name searching module 340.

The second image database selecting module 324 receives information of the image database 38 through the network 36 by using the receiving module 410. On the basis of the information, the second image database selecting module 324 selects a second image database storing a feature of a kind other than the predetermined kind selected by the feature selecting module 310 out of the features extracted by the first feature extracting module 300. Then, the second image database selecting module 324 outputs the information showing the second image database to the candidate name searching module 340.

The candidate name searching module 340 includes a first searching module 342 and a second searching module 344. The first searching module 342 searches for a candidate for the name of the main object by using the feature of the predetermined kind selected by the feature selecting module 310 in the first image database selected by the first image database selecting module 322. Specifically, the first searching module 342 transmits the feature of the predetermined kind to the first image database through the network 36 by using the transmitting module 400. Then, the first searching module 342 receives the result of searching the first image database through the network 36 by using the receiving module 410 and outputs the received candidate for the name of the main object to the overlapped object selecting module 350.

The second searching module 344 searches for the name of the main object by using the feature of the kind other than the predetermined kinds selected by the feature selecting module 310 in the second image database selected by the second image database selecting module 324. Specifically, the second searching module 344 transmits the feature of another kind to the second image database through the network 36 by using the transmitting module 400. Then, the second searching module 344 receives the result of searching the second image database through the network 36 by using the receiving module 410 and outputs the received explanation of the main object to the overlapped object selecting module 350.

The overlapped object selecting module 350 shown in FIG. 10 selects an overlapped object which is searched out in both the first and second image databases on the basis of the name of the main object that is the search result received from each of the first searching module 342 and the second searching module 344. Specifically, the overlapped object selecting module 350 selects an object, which has having the same names out of the plurality of objects included in the search result received from each of the first searching module 342 and the second searching module 344, as the overlapped object. Then, the overlapped object selecting module 350 outputs the name of the overlapped object as the name of the main object to the explanation retrieving module 370 show in FIG. 10.

The first image database selecting module 322 may select an image database 38, in which the first searching module 342 can search for an explanation of the main object more precisely by using the feature of the predetermined kind extracted by the first feature extracting module 300 and selected by the feature selecting module 310, with higher priority out of the plurality of the databases 38 as the first image database. Specifically, the first image database selecting module 322 may select an image database 38, which has more objects storing an explanation corresponded to the feature of the predetermined kind than other image databases, with higher priority out of the plurality of image databases 38 as the first image database.

Further, the second image database selecting module 324 may select an imaged at a base 38, in which the second searching module 344 can search for an explanation of the main object more precisely by using the feature of another kind different from the predetermined kind extracted by the first feature extracting module 300 and selected by the feature selecting module 310, with higher priority out of the plurality of the databases 38 as the second image database. Specifically, the second image database selecting module 324 may select an image database 38, which has more objects storing an explanation corresponded to the feature of another kind than other image databases, with higher priority out of the plurality of image databases 38 as the second image database. Further, each of the first image database selecting module 322 and the second image database selecting module 324 may acquire the number of objects storing an explanation corresponded to the feature of the object with respect to each of the plurality of kinds of the features of through the communication module 34 from each of the plurality of image databases 38.

Furthermore, the configuration shown in the present figure is an example and various changes can be made to the configuration of the present figure. For example, although the pictorial book processing module 32 searches for the explanation of the main object in the first image database by using the feature of the predetermine kind selected by the feature selecting module 310 and the second image database by using the feature of another kind, the pictorial book processing module 32 may select a group of features of an arbitrary number from the plurality of features extracted by the first feature extracting module 300 by using the feature selecting module 310 so as to execute search of one (1) image database or the databases more that three (3). Then, the overlapped object selecting module 350 may selects an overlapped name from the result of searching for the plurality of databases 38 as the name of the main object and output the overlapped name to the explanation retrieving module 370.

According to the pictorial book system 10 of the present embodiment, it is possible to select an image database to be searched among the plurality of image databases and search for an explanation of the main object on the basis of result of the search of the image database 38. Thus, appropriate load distribution can be accomplished without using a load distributing system such as the load balance for the conventional information searching system. Thus, since the digital pictorial book system 10 can access directly to the image database 38, it is possible to improve response speed of the search process.

Further, according to the digital pictorial book system 10, it is possible to select an image database 38, in which an explanation of the main object is searched out more precisely by using the feature of the predetermined kind selected by the feature selecting module 310, as the first image database and select an image database 38, in which an explanation of the main object is searched out more precisely by using the feature of another kind, as the second image database. Thus, it is possible to search for an explanation of the main object precisely by using each of the features extracted from the image with respect to an image database 38 in which an explanation of the main object can be searched precisely for the kind of the feature, even if the precision of the search is subject to variation according to the kind of the feature, that is, it is possible to search for an explanation of the object in case of using a feature of a kind but it is impossible to search for an explanation of the object in case of using a feature of another kind.

Furthermore, it is possible to search for an explanation of the main object precisely by using the image database selected by the first image database selecting module 322 and the second image database selecting module 324 by determining that an image database 38 in which explanations of more objects are searched out for a feature of a kind is the image database 38 in which information of the object can be searched out more precisely for the feature of the kind.

Furthermore, it is possible to select an appropriate image database 38 and search for an explanation of the main object precisely by acquiring the number of objects storing an explanation for each kind of the feature and deciding the precision of search, even if various image databases 38, for example, open on the Internet are used.

Figure 12A:
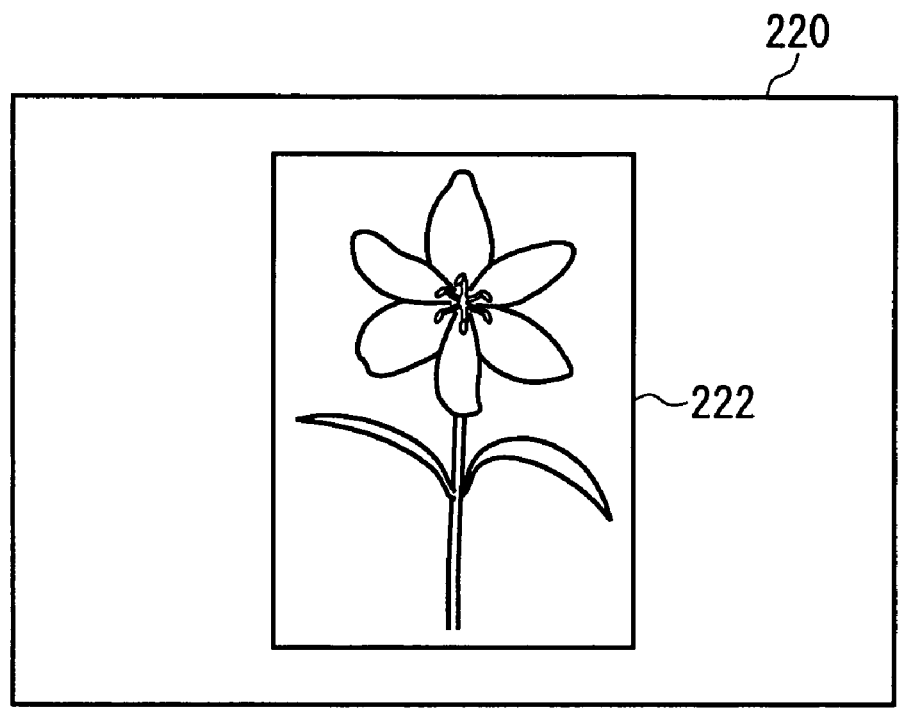
FIGS. 12A and 12B show an example of the process by a feature extracting module 300 according to the embodiment of the present invention.

FIG. 12 shows an example of the process by the feature extracting module 300 according to the present embodiment. FIG. 12A shows an image 200 which the first feature extracting module 300 receives from the image processing module 130. The first feature extracting module 300 extracts a feature of a main object from an image of the main object surrounded by a frame 222. Here, the first feature extracting module 300 may select a feature to be extracted on the basis of information showing the size or the kind of the main object, which is input by the user beforehand, so as to reduce the time taken to search for an explanation and acquire correct search result. For example, in case the user judges the main object a flower, the user inputs information showing that the main object is a flower to the digital pictorial book system 10 by using a kind input module not shown. Then, the first feature extracting module 300 extracts a feature predetermined for each kind of the main object on the basis of the input information.

For example, in case the user inputs that the main object is a flower, the first feature extracting module 300 executes a process of extracting a contour shape for the image data the main object surrounded by the frame 222. Then, the first feature extracting module 300 divides the image data into a flower part and a stem and leaf part on the basis of color distribution of the inside of the acquired contour shape. Then the first feature extracting module 300 extracts a color and a contour shape of the flower as features.

Figure 12B:
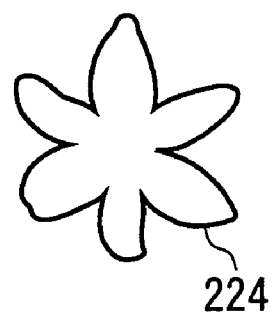

FIG. 12B shows the contour shape of the flower in the main object of the image 220 extracted by the first feature extracting module 300. Further, the first feature extracting module 300 extracts the number of the petal as a feature by executing shape recognition for the contour shape of the flower. In addition, the first feature extracting module 300 extracts the number of the stamen as a feature by executing the shape recognition of the flower part of the image data of the main object. Then, the first feature extracting module 300 outputs the extracted features to the feature selecting module 310.

FIG. 13 shows a first example of the image database 38 according to the present embodiment. The feature selecting module 310 selects a part of the features extracted by the first feature extracting module 300. For example, the feature selecting module 310 selects the color and the contour shape of the flower out of the color of the flower, the contour shape of the flower, the number of the petal, and the number of the stamen. Then, the feature selecting module 310 outputs information showing the selected features to the display module 320.

The image database selecting module 320 selects a first image database storing the color and the contour shape of the flower which are a part of the features selected by the feature selecting module 310 and a second image database storing the number of the petal and the number of the stamen which are other features selected by the feature selecting module 310.

Figures 13A, 13B:
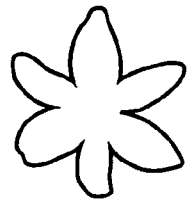
FIGS. 13A and 13B show a first example of an image database 38 according to the embodiment of the present invention.

FIG. 13A shows an example of a first image database 226 selected by the image database selecting module 320. FIG. 13B shows a second image database 228 selected by the image database selecting module 320. The first searching module 342 searches for an object, of which the color and the contour shape of the flower are white and the contour shape 224, respectively, in the first image database 226. The second searching module 344 searches for an object, of which the number of the petal and the number of the stamen are six (6) and six (6), respectively, in the second image database 228.

The overlapped object selecting module 350 selects, for example, "Easter Lily" as an overlapped object, which is searched out by the first searching module 342 and the second searching module 344, out of the objects selected by the first searching module 342 and the second searching module 344. Then, the explanation searching module 370 retrieves an explanation of the "Easter Lily" selected by the overlapped object selecting module 350 from the first image database 226 and the second image database 228 and displays on the display module 50.

According to the digital pictorial book system 10 of the present embodiment, in case of searching for an explanation of the main object in the plurality of image databases 38, the search results of the image databases 38 are prevented from being similar each other by executing search on the basis of the features different for each of the plurality of image databases 38. Thus, it is possible to narrow-down the search result efficiently and acquire the search result correctly.

FIG. 14 shows a second example of the image database 38 according to the present embodiment. The image database 38 may further store features of a thing having high relevance with the object corresponded to the explanations of the object, respectively, in addition to the features of the object stored in the image database 38 shown in FIG. 13. For example, in case the object is a flower, the image database 38 may store a feature showing the color of the ground on which the flower blooms as a feature of a thing having high relevance with the object. In the present figure, the image database 38 stores a quantity of feature showing "Deep brown" corresponded to the explanation about the object showing "Easter Lily." Further, the image database 38 may store quantities of feature showing the color of sandy soil, the color of a rock, and the like, corresponded to explanations about the object other than "Easter Lily."

The second feature extracting module 302 extracts a feature of an object other than the main object selected by the main object selecting module 140 from the image captured by the image capturing module 100. For example, the second feature extracting module 302 detects an object showing the ground on the basis of the position of the object in the screen, color distribution of the object, or positional relationship with the main object, out of a plurality of objects which are included in the captured image and extracted by a process of extracting contour shape. Then, the second feature extracting module 302 recognizes the color of the selected object showing the ground. For example, the second feature extracting module 302 may detect a color range having the highest degree of focusing in color distribution of the object showing the ground out of a plurality of predetermined color ranges.

Then, the feature selecting module 310 selects a feature of a predetermined kind out of a plurality of features of the main object which are extracted by the first feature extracting module 300, and selects a feature of a predetermined kind out of a plurality of features of an object other than the main object which are extracted by the second feature extracting module 302. The first image database selecting module 322 selects an image database 38, which stores the feature of the predetermined kind selected by the feature selecting module 310 out of the kinds of the features extracted by the first feature extracting module 300 and the feature of the predetermined kind selected by the feature selecting module 310 out of the kinds of the features extracted by the second feature extracting module 302, as a first image database. The first image database selecting module 322 may select an image database 38, in which the first searching module 342 can search for an explanation of the main object more precisely by using the feature of the predetermined kind extracted by the first feature extracting module 300 and the feature of the predetermined kind extracted by the second feature extracting module 302, with higher priority out of the plurality of the databases 38 as the first image database.

Further, the second image data base selecting module 324 selects an image database 38, which stores a feature of a kind other than the predetermined kind selected by the feature selecting module 310 out of the kinds of the features extracted by the first feature extracting module 300 and a feature of a kind other than the predetermined kind selected by the feature selecting module 310 out of the kinds of the features extracted by the second feature extracting module 302, as a second image database. The second image database selecting module 324 may select an image database 38, in which the second searching module 344 can search for an explanation of the main object more precisely by using the feature of another kind extracted by the first feature extracting module 300 and the feature of another kind extracted by the second feature extracting module 302, with higher priority out of the plurality of the databases 38 as the second image database.

The first searching module 342 searches a candidate for the name of the main object from the first image database selected by the first image database selecting module 322 by using both the feature of the predetermined kind selected by the feature selecting module 310 out of the kinds of the features extracted by the first feature extracting module 300 and the feature of the predetermined kind selected by the feature selecting module 310 out of the kinds of the features extracted by the second feature extracting module 302. Further, the second searching module 344 searches a candidate for the name of the main object from the second image database selected by the second image database selecting module 324 by using both a feature of a kind other than the predetermined kind selected by the feature selecting module 310 out of the kinds of the features extracted by the first feature extracting module 300 and a feature of a kind other than the predetermined kind selected by the feature selecting module 310 out of the kinds of the features extracted by the second feature extracting module 302. As described with regard to FIG. 11, the overlapped object selecting module 350 selects the name of the main object on the basis of the results of searching for the candidate for the name of the main object by each of the first searching module 342 and the second searching module 344 and outputs the name of the main object to the explanation retrieving module 370.

According to the pictorial book system 10 of the embodiment of the present invention, it is possible to search for an explanation of the main object further on the basis of features of objects other than the main object which are an image of the background and an image of things existing around in the captured image. Thus, for example, in case the main object is a plant, the main object can be specified on the basis of more information as a plant, which is the main object, can be specified on the basis of information showing an environment in which the main object grows up, that is, the color of the ground on the plant lives, plants growing up in the same environment with the main object, and the like. Therefore, according to the digital pictorial book system 100, it is possible to search for an explanation of the main object more precisely.

FIG. 15 shows a third example of the image database 38 according to the present embodiment. In addition to a feature of an object stored in the first image database 226 or the second image database 228, the image database 38 may further store the range of the capture day and/or time of the object corresponded to an explanation of the object. For example, in case the main object is a flower, the range of the capture day and/or time may be a period of a year within which the flower blooms.

The annexed information acquiring module 304 acquires information annexed to the image captured by the image capturing module 100. For example, the annexed information acquiring module 304 acquires the capture day and/or time as annexed information. Then, the feature selecting module 310 selects a feature of a predetermined out of the features of the main object of the kinds extracted by the first feature extracting module 300 and selects annexed information of a predetermined kind out of information annexed to the image of a plurality of kinds.

The first image database selecting module 322 selects an image database 38, which stores the feature of the predetermined kind selected by the feature selecting module 310 out of the kinds of the features extracted by the first feature extracting module 300 and the annexed information of the predetermined kind selected by the feature selecting module 310 out of the kinds of the features acquired by the annexed information acquiring module 304, as a first image database. For example, in case the feature selecting module 310 selects the data and time of image capturing as the annexed information of the predetermined kind, the first image database selecting module 322 selects an image database 38, which stores an explanation of the object further corresponded to the capture day and/or time of the object in addition to the feature of the predetermined kind of the object, out of the plurality of image data bases 38, as the first image data base. Further, the first image database selecting module 322 may select an image database 38, in which the first searching module 342 can search for an explanation of the main object more precisely by using the feature of the predetermined kind extracted by the first feature extracting module 300 and the annexed information of the predetermined kind acquired by the annexed information acquiring module 304, with higher priority out of the plurality of the databases 38 as the first image database.

Further, the second image database selecting module 324 selects an image database 38, which stores a feature of a kind other than the predetermined kind selected by the feature selecting module 310 out of the kinds of the features extracted by the first feature extracting module 300 and annexed information of a kind other than the predetermined kind selected by the feature selecting module 310 out of the kinds of the annexed information acquired by the annexed information acquiring module 304, as a second image database. The second image database selecting module 324 may select an image database 38, in which the second searching module 344 can search for an explanation of the main object more precisely by using the feature of another kind extracted by the first feature extracting module 300 and the annexed information of another kind extracted by the annexed information acquiring module 304, with higher priority out of the plurality of the databases 38 as the second image database.

The first searching module 342 searches the name of the main object from the first image database selected by the first image database selecting module 322 by using both the feature of the predetermined kind selected by the feature selecting module 310 out of the kinds of the features extracted by the first feature extracting module 300 and the annexed information of the predetermined kind selected by the feature selecting module 310 out of the kinds of the annexed information acquired by the annexed information acquiring module 304. For example, in case the feature selecting module 310 selects the data and time of image capturing as the annexed information of the predetermined kind, the first searching module 342 search a name of an object, which corresponds to the feature of the predetermined kind of the object and the range including the capture day and/or time, from the first image database selected by the first database selecting module 322 as the name of the main object. Further, the second searching module 344 searches the name of the main object from the second image database selected by the second image database selecting module 324 by using both a feature of a kind other than the predetermined kind selected by the feature selecting module 310 out of the kinds of the features extracted by the first feature extracting module 300 and annexed information of a kind other than the predetermined kind selected by the feature selecting module 310 out of the kinds of the annexed information acquired by the annexed information acquiring module 304. As described with regard to FIG. 11, the overlapped object selecting module 350 selects the name of the main object on the basis of the results of searching for the name of the main object by each of the first searching module 342 and the second searching module 344 and outputs the name of the main object to the explanation retrieving module 370.

According to the digital pictorial book system 10 of the embodiment of the present invention, it is possible to search for an explanation of the main object more precisely by executing search on the basis of the information annexed to the image in addition to the feature of the main object.

Further, according to the digital pictorial book system 10, it is possible to search for an explanation of the main object further on the basis of the capture day and/or time. For example, in case the main object is a flower, it is possible to search for an explanation of the flower which has the feature similar with the main object from flowers blooming at the capture day and/or time out of a plurality of objects stored in the image database 38. Therefore, it is possible to search for an explanation of the main object more precisely and more efficiently.

Furthermore, at least a part of the plurality of image databases 38 may store an explanation of an object corresponding to a specified capture day and/or time. Specifically, at least a part of the plurality of image databases 38 may store an explanation of an object corresponding to a specified season. Here, the range of the data and the time of image capturing indicated by the specified season may be stored in the image database selecting module 320 beforehand or may be acquired by the image database selecting module 320 from each of at least a part of the plurality of image databases 38 through the communication module 34.

Thus, for the specified range of the day and time, it is possible to reduce the size of the image database 38 without decreasing precision of search, that is, the number of objects which can be searched. Further, in case the size of the image database 38 is the same, it is possible to improve precision of search. For example, in case the main object is a flower, if an image database 38 stores only the explanation of flowers blooming in a specified season, that is, the "spring," and the capture day and/or time is included in a period predetermined as the "spring," it is possible to search for the explanation of a flower of the "spring" by selecting the image database 38 even although the size of the image database 38 is smaller than an image database storing explanations of flowers regardless of season. Therefore, it is possible to improve convenience of the user because electronic devices, which have been used as a digital pictorial book system due to insufficient memory capacity, can be used as a digital pictorial book system which is able to search for an explanation of the main object with high precision.

Figure 16:
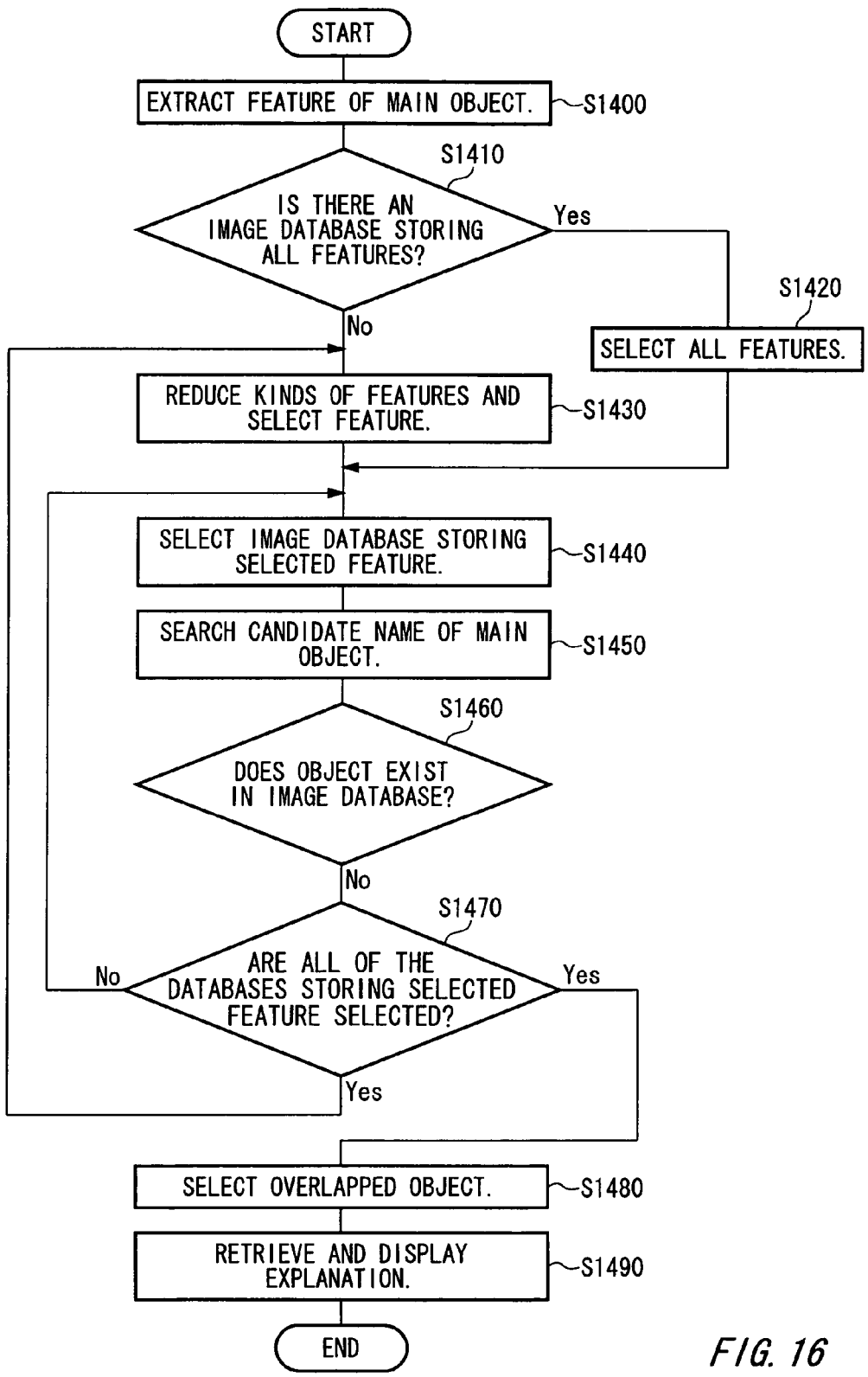
FIG. 16 is a flowchart exemplary showing the process by a pictorial book processing module 32 according to the embodiment of the present invention.

FIG. 16 is a flowchart to show an example of the process by the pictorial book processing module 32 according to the present embodiment. In case the operation mode of the digital pictorial book system 10 is the "digital pictorial book mode," the first feature extracting module 300 receives an image captured by the image capturing apparatus 20 and information showing a region of a main object selected from the image from the image processing module 130 and extracts features of the main object of the image (S1400).

The feature selecting module 310 determines whether or not an image database storing features of all the kinds extracted by the first feature extracting module 300 is included in the plurality of image databases 38 (S1410). In case the image database storing the features of all the kinds is included in the plurality of image databases 38 (S1410: Yes), the feature selecting module 310 selects the features of all the kinds (S1420).

On the other hand, in case the image database storing the features of all the kinds is not included in the plurality of image databases 38 (S1410: No), the feature selecting module 310 reduces the kinds of the features and selects a part of the features (S1430). Thus, even if the size of the image database 38, which is available, is small and all the extracted features cannot be used to search for an explanation of the main object, it is possible to execute the search by using the image database 38. Further, since various image databases 38 can be used for the search, it is possible to obtain search result covering a wide search range with high precision.

The image database selecting module 320 selects a first image database which stores the feature of the kind selected by the feature selecting module 310 and a second image database which stores a feature of the kind different from the kind selected by the feature selecting module 310 (S1440). The first searching module 342 and the second searching module 344 searches a candidate for the name of the main object from the first image database and the second image database, respectively (S1450). The candidate name searching module 340 determines whether or not a candidate for the name of the main object is searched out for each image database 38, that is, whether or not an object is searched out by the feature of the selected kind in the selected image database 38 (S1460).

In case an object is not searched out by the feature of the selected kind in the selected image database 38 (S1460: No), the image database selecting module 320 determines whether or not all of the selectable image databases 38 are selected out of the plurality of image databases 38 (S1470). In case all of the selectable databases are not selected yet (S1470: No), the image database selecting module 320 returns to S1440 and selects one of the selectable image databases 38.

In case all of the selectable image databases 38 are selected, that is, an object is not searched out by the feature extracted by the first feature extracting module 300 in none of the plurality of image databases 38 (S1470: Yes), the feature extracting module 310 reduces the kinds of the features and selects a feature again (S1430). Thus, for example, even if the captured image is of inferior quality and all the kinds of the extracted features cannot be used in order to obtain correct search result due to worse capturing conditions, it is possible to search for an explanation of the main object without requesting the user to improve the capturing conditions and thus improve convenience of the user.

Further, the feature extracting module 310 may except a feature of a predetermined kind among the features extracted by the first feature extracting module 300 from either the kinds of the features used to search for the candidate name of the main object in the first image database by the first searching module 342 or the kinds of the features used to search for the candidate name of the main object in the second image database by the second searching module 344. Thus, in case a search success ratio is low for reasons that the feature extracted by the first feature extracting module 300 has big noises, and the like, it is possible to raise a search success ratio by excluding the feature resulting the low search success ratio.

On the other hand, in case an object is searched out by the feature of the selected kind in the selected image database 38 (S1460: Yes), the overlapped object selecting module 350 selects a name which overlaps in a plurality of image databases 38 out of the candidates for the name of the main object searched out in each of the image databases 38 as the name of the main object (S1480). The explanation retrieving module 370 retrieves an explanation of the main object on the basis of the name selected by the overlapped object selecting module 350, displays and provides the explanation to the user by the display module 50 (S1490).

As described above, according to the digital pictorial book system 10 of the embodiment of the present invention, it is possible to search for an explanation of the main object precisely.

Further, although the digital pictorial book system 10 in the present figure searches an explanation of the main object on the basis of only the feature of the main object extracted by the first feature extracting module 300, the digital pictorial book system 10 may search an explanation of the main object further on the basis of a feature of an object other than the main object and information annexed to the captured image acquired by the annexed information acquiring module 304.

Figure 17:
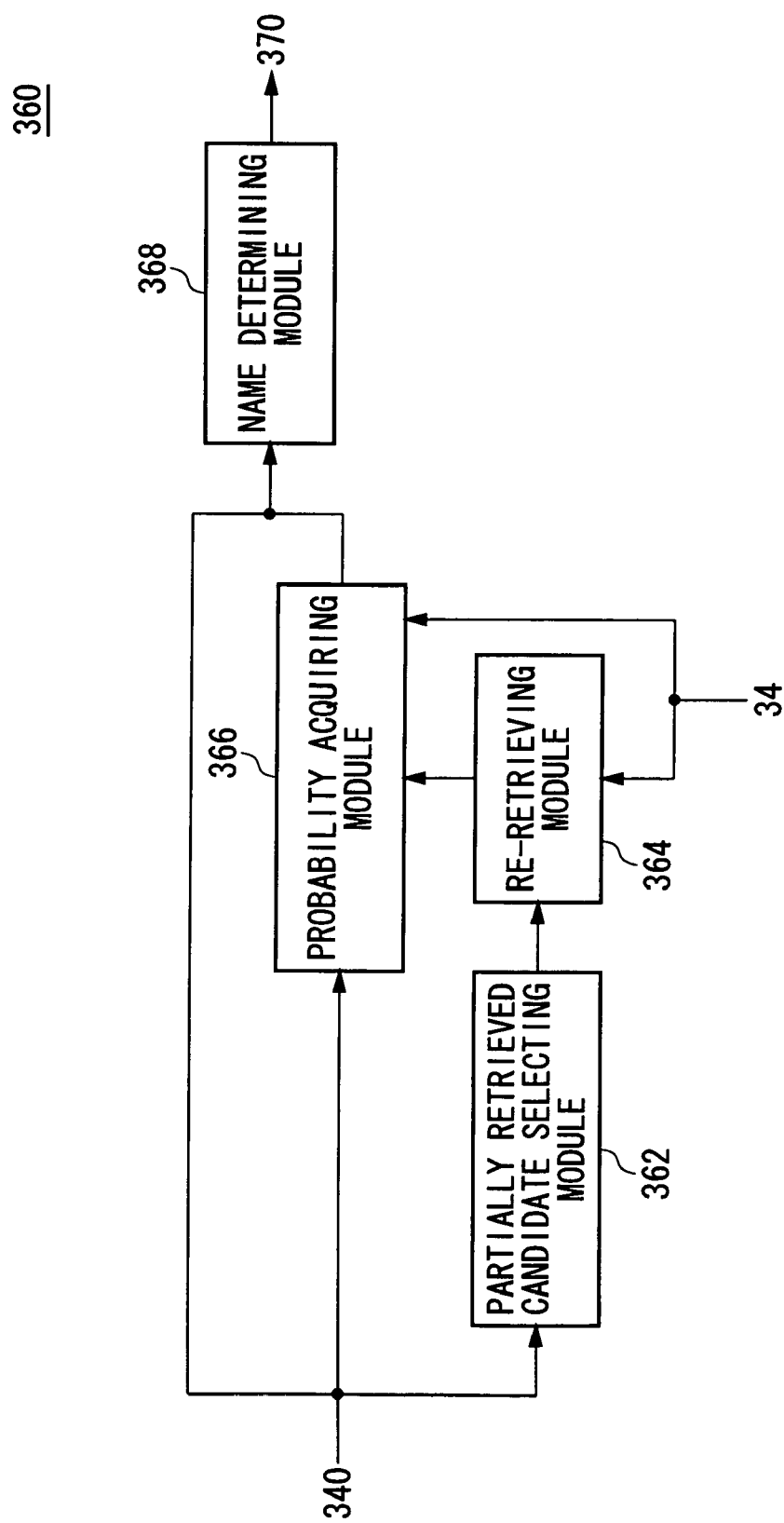
FIG. 17 is a block diagram exemplary showing a name determining unit 360 according to the embodiment of the present invention in detail.

FIG. 17 is block diagram to show an example of the name determining unit 360 according to the present embodiment in detail. An object of the name determining unit 360 according to the embodiment of the present invention is to determine the name of the main object precisely in case a plurality of candidates are searched out by the candidate name searching module 340.

The name determining unit 360 includes a partially searched candidate selecting module 362, a re-searching module 364, a probability acquiring module 366, and a name determining module 368. In case there is not no candidate name searched out by the candidate name searching module 340 in any of the plurality of image databases 38, the partially searched candidate selecting module 362 selects a candidate name, which is searched out in a part of the plurality of image databases 38 and not in the other image databases 38, and outputs information showing the selected candidate name to the re-searching module 364. The re-searching module 364 searches the image databases 38 by using the communication module 34 to determine whether or not the candidate name selected by the partially searched candidate selecting module 362 is registered to another image database 38 and outputs the search result to the probability acquiring module 366.

The probability acquiring module 366 receives the candidate names searched out by the candidate name searching module 340 and acquires a probability of the main object's having the candidate name for each combination of the image database 38 and the candidate name from the image database 38 through the communication module 34. Here, in case the candidate name searching module 340 acquires an index value of the probability of the main object's having the candidate name along with the search result of the candidate name, the probability acquiring module 366 may acquire the index value of the probability from not the image database 38 but the candidate name searching module 340.

Further, in case there is a candidate name searched out by the candidate name searching module 340 in any of the plurality of image databases 38, the probability acquiring module 366 adjusts the index value of the probability acquired for each combination of the image database 38 and the candidate name on the basis of the search result input from the re-search module 364. Then, the probability acquiring module 366 outputs the index value of the probability of the main object's having the candidate name, which is acquired for each combination of the image database 38 and the candidate name, to the name determining module 368.

The name determining module 368 determines a most certain name on the basis of the index value of the probability of the main object's having each candidate name received from the probability acquiring module 366. Then, the name determining module 368 outputs the determined name of the main object to the explain retrieving module 370 shown in FIG. 10.

According to the digital pictorial book system of the embodiment of the present invention, in case a plurality of the candidate names are searched out, it is possible to determine the name of the main object precisely by using an index value of a probability showing certainty of each of the candidate names.

FIG. 18 shows an example of the process by the name determining unit 360 according to the present embodiment. FIG. 18A shows the number of names of objects registered to each image database 38 and candidate names searched out in the image database 38. For example, the names of objects registered in the image database A 38 number 100 and two (2)

candidate names (Lily, Rose) are searched out by the candidate name searching module 340.

FIG. 18B shows an index value of a probability of the main object's having each candidate name acquired by the probability acquiring module 366. The probability acquiring module 366 acquires the index value of the probability of the main object's having each candidate name for each image database 38. The index value of the probability of the main object's having a candidate name is an index showing to what extent it is certain that the candidate name searched out in the image database 38 is the name of the main object. For example, it is desirable that a candidate name searched out has a larger index value when more a reliable result is acquired as if a small number of candidate names are searched out in a large image database 38.

For example, the probability acquiring module 366 acquires a value acquired by using the number of the names of objects stored beforehand in each image database 38 and the number of the candidate names searched out in the image database 38, more specifically, a value of the number of the names of objects stored beforehand in each image database 38 divided by the number of the candidate names searched out in the image database 38, as an index value from the image database 38. Instead, the probability acquiring module 366 may acquire the index value by acquiring the number of the names of object stored beforehand in each image database 38 from the image database 38 and dividing the acquired number of the names of object by the number of the candidate names searched out in the image database 38.

Then, for each candidate name, the probability acquiring module 366 acquires the sum of index values of all image databases 38 in which the candidate name is searched out. For example, in case the candidate name is "Lily," the probability acquiring module 366 acquires 200 which is the sum of the index value 100/2 of the image database A 38 and the index value 300/2 of the image database B 38.

Here, in case the re-searching module 364 detects that the candidate name selected by the partially searched candidate selecting module 362 is registered in another image database 38, the probability acquiring module 366 reduces the index value of the probability of the main object's having the candidate name. For example, the probability acquiring module 366 subtracts an index value acquired by using the number of the names of object stored in another image database and the number of candidate names searched out in the image database from an index value of the probability of the main object is having the candidate name selected by the partially searched candidate selecting module 362. Specifically, in case "Water Lily" among the candidate names shown in FIG. 18B is registered in the image database A 38, the probability acquiring module 366 adjusts the index vale by subtracting 100/2 which is an index value for the candidate names searched out in the image database A 38 from 216 which is the sum of index values for "Water Lily." Then, the probability acquiring module 366 outputs the sum of index values for each candidate name to the name determining module 368. The name determining module 368 determines "Lily," which is a candidate having the largest sum of index values of the candidate names, as the name of the main object.

Further, although the probability acquiring module 366 acquires the sum of index values for each candidate name in the above description, the probability acquiring module 366 may output each index value individually to the name determining module 368. In this case, the name determining module 368 may determines a candidate name having the largest index value as the name of the main object. Further, in case the candidate name selected by the partially searched candidate selecting module 362 is registered in another image database 38, the probability acquiring module 366 subtracts a value of an index value for a candidate name searched out in the another image database 38 or the value multiplied by a predetermined coefficient from an index value of each image database 38 for the candidate name selected by the partially searched candidate selecting module 362.

According to the digital pictorial book system 10 of the present embodiment, it is possible to determine the name of the main object precisely by attaching importance to the search result of a larger image database even if the numbers of the candidate names searched out in a plurality of image databases 38 are the same. Further, according to the digital pictorial book system 10 of the present embodiment, even if an image database 38 has imprecise data and outputs a candidate name excepted from other image databases 38, it is possible to determine the main object precisely by reducing the index value of the probability for the output of the image databases 38.

Figure 19:
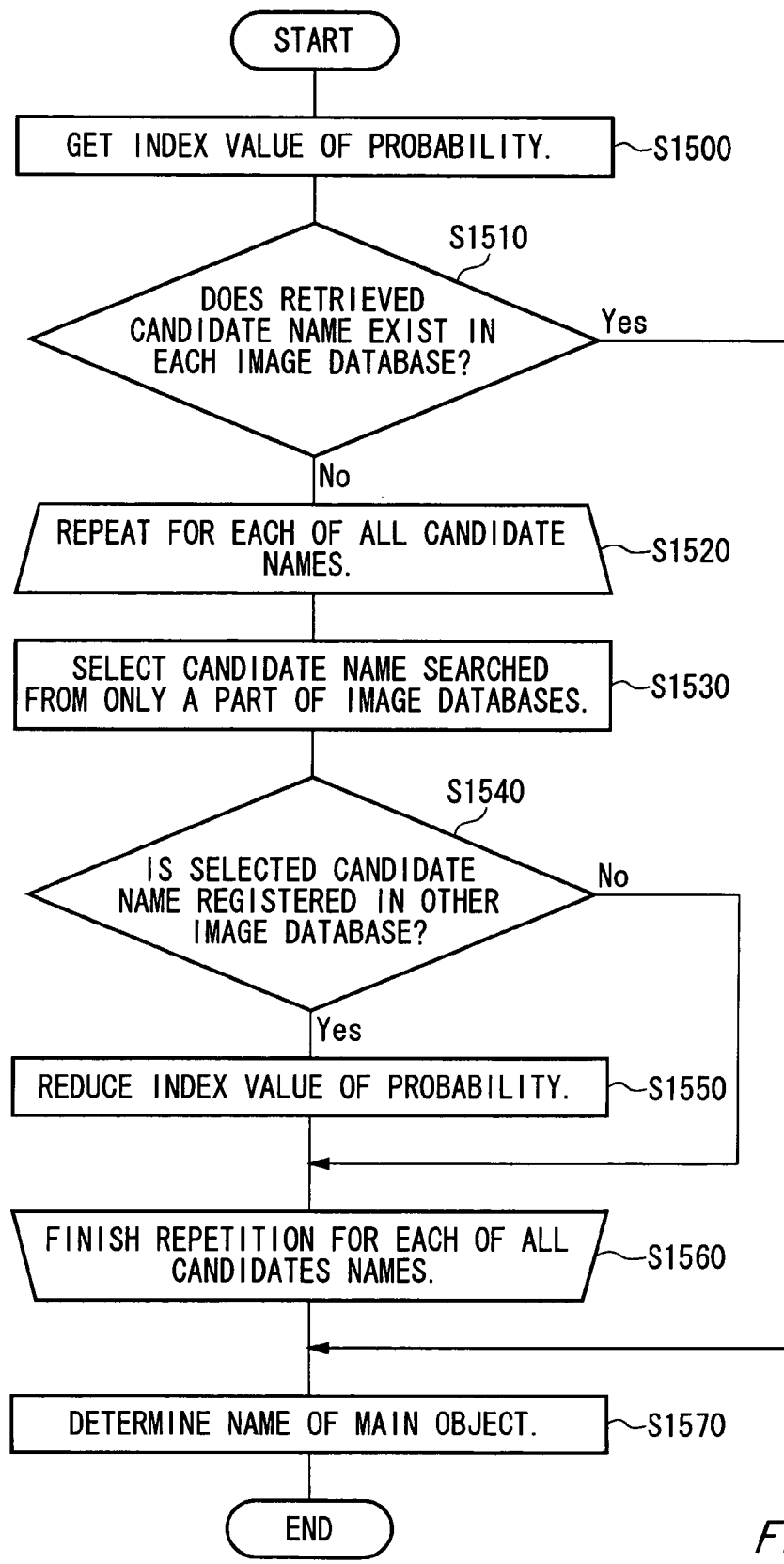
FIG. 19 is a flowchart exemplary showing a process flow by the name determining unit 360 according to the embodiment of the present invention.

FIG. 19 is a flowchart to show an example of a process flow by the name determining unit 360. The probability acquiring module 366 acquires an index value of a probability of the main object's having each of the candidate names searched out by the candidate name searching module 340 for each combination of the image database 38 and the candidate name (S1500).

The name determining unit 360 determines whether or not there is a candidate name searched out in any of the plurality of image databases 38 of the candidate names (S1510). In case that there are candidate name(s) searched out in all of the plurality of image databases 38 (S1510: Yes), the name determining module 368 determines the most certain name of the main object on the basis of the index value of the probability acquired for each of the candidate name(s) (S1570).

In case there is no candidate name searched out in any of the plurality of image databases 38 (S1510: No), the name determining unit 360 repeats the following processes for each of all the candidate names searched out (S1520).

The partially searched candidate selecting module 362 selects the candidate name (S1530). The re-search module 364 searches and determines whether or not the candidate name selected by the partially searched candidate selecting module 362 is registered in another image database (S1540). In case the candidate name selected by the partially searched candidate selecting module 362 is registered in another image database (S1540: Yes), the probability acquiring module 366 repeats the processes of S1530 to S1550 for all the candidate names searched out (S1560).

Then, the name determining unit 368 determines the most certain name by using the index value of the probability for each of the candidate names searched out from a part of the plurality of image databases 38 (S 1570). Thus, even if the image databases 38 used to search for the candidate name include an incomplete image database 38 and an image database 38 covering a narrow search range, it is possible to determine the name of the main object precisely.

Figure 20:
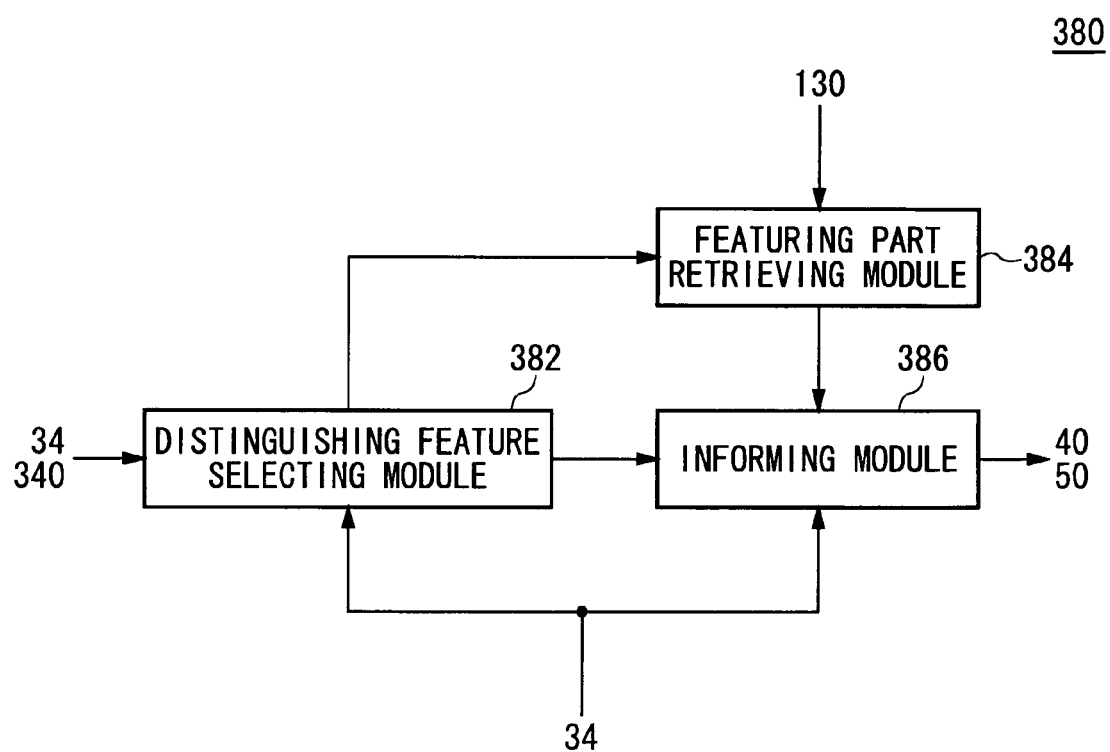
FIG. 20 is a block diagram exemplary showing an informing unit 380 according to the embodiment of the present invention in detail.

FIG. 20 is a block diagram to show an example of the informing unit 380 according to the present embodiment. It is an object of the informing unit 380 according to the embodiment of the present invention to improve convenience of the user, in case a plurality of candidate names are searched out by the candidate name searching module 340, by advising the user what image to capture in order to narrow down the candidate names efficiently.

The informing unit 380 includes a distinguishing feature selecting module 382, a featuring part searching module 384, and an informing module 386. In case candidate names of a plurality of objects are searched out by the candidate name searching module 340, the distinguishing feature selecting module 382 selects a distinguishing feature, of which an overlap of certainty distributions is the smallest for each object and each kind of the feature out of the different kinds of features stored in the image database corresponded to the plurality of objects. Here, the distinguishing feature is specifically a part of an object, for example, a petal, a leaf, a stamen, and the like, in case the object is a flower. Then, the distinguishing feature selecting module 382 outputs information showing the selected distinguishing feature to the featuring part searching module 384 and the informing module 386.

The featuring part searching module 384 receives the information on the distinguishing feature from the distinguishing feature selecting module 382. Then, the featuring part searching module 384 searches for an image showing a part of the main object corresponding to the distinguishing feature in the image of the main object received from the image processing module 130 and outputs information showing the image, for example, information showing the region of the image, to the informing module 386.

The informing module 386 receives the information showing the distinguishing feature from the distinguishing feature selecting module 382 and the information showing the region of the part corresponding to the distinguishing feature of the main object from the featuring part searching module 384. Then, the informing module 386 informs the user of the digital pictorial book system 10 of the content of the distinguishing feature selected by the distinguishing feature selecting module 382. Specifically, by outputting the information showing the region of the part corresponding to the distinguishing feature to the frame display module 40, the informing module 386 displays a frame, which surrounds the part, on the display module 50. Thus, the informing module 386 can inform the user that the part should be captured.

According to the informing unit 380 of the embodiment of the present invention, it is possible to improve convenience of the user because the informing module 386 makes the user know how to execute narrow-down efficiently by informing the user which part to capture.

Further, the configuration shown in the present figure is an example and various changes can be made to the configuration. For example, the informing unit 380 may not include the featuring part searching module 384. Here, in case the image database 38 has an image of a part showing each of features of different kinds stored correspondently to a plurality of objects, the informing module 386 may acquire an image of a part having a distinguishing feature from the image database 38 by using the communication module 34 on the basis of the information showing the distinguishing feature received from the distinguishing feature selecting module 382, and display the image on the display module 50. Thus, the image database 38 may inform the user that an image of the part of the main object, which is the distinguishing feature, should be captured. Therefore, the user can narrow down the candidate names efficiently without knowing the name of the part.

FIG. 21 shows an example of certainty distributions of features stored in the image database 38 according to the present embodiment. FIG. 21A shows an example of a certainty distribution of each object and each kind of features. The certainty distribution of a feature corresponded to each of objects (Lily, Rose, . . . ) and each kind of features (feature A, feature B, . . . ) shows a relationship between the quantity of feature showing a value of the feature and a probability of the object's having each of the names. Specifically, the distribution 240 shows that a probability of the object's being a lily is P1 in case a quantity of feature extracted of the object is V1.

FIG. 21B shows an overlap of certainty distributions of feature A corresponding to each of the lily and the rose. FIG. 21C shows an overlap of certainty distributions of feature B corresponding to each of the lily and the rose. As shown in FIG. 21B, the object of which amount of quantity for feature A is V5 includes both the lily and the rose. This is because the overlap of the certainty distributions of the lily and the rose for feature A is large. Thus, it is difficult for the candidate name selecting module 340 to distinguish the lily from the rose in case of searching by using the feature A.

On the other hand, as shown in FIG. 21C, the object of which amount of quantity for feature A is V5 includes the lily but does not include the rose. This is because the overlap of the certainty distributions of the lily and the rose for feature A is small. Thus, it is possible for the candidate name selecting module 340 to distinguish the lily from the rose in case of searching by using the feature B.

As shown in the present figure, the distinguishing feature selecting module 382 acquires the size of the overlap of the certainty distribution of each object and each feature from the image database 38. Then, in case it is required to distinguish the lily from the rose, the distinguishing feature selecting module 382 selects feature B as the distinguishing feature and outputs information showing feature B to the featuring part searching module 384 and the informing module 386.

According to the digital pictorial book system 10 of the embodiment of the present invention, it is possible to execute narrow-down efficiently by selecting a distinguishing feature on the basis of an overlap of certainty distributions.

Figure 22A:
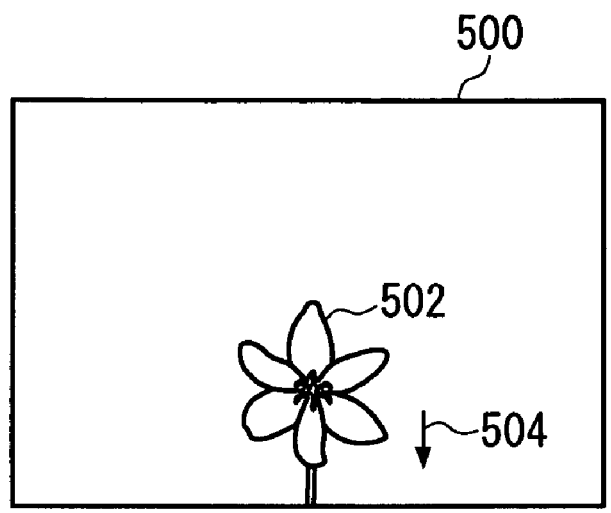
FIGS. 22A and 22B are block diagrams exemplary showing an informing unit 380 according to the embodiment of the present invention in detail.
Figure 22B:
Figure 22B:
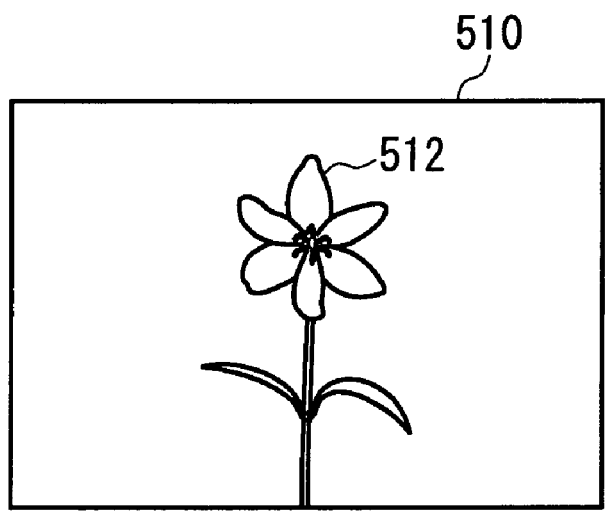

FIG. 22 shows a first example of the process of informing by the informing module 386 according to the present embodiment. According to the present example, after capturing an image 500 and trying to search for an explanation of a main object 502, the user of the digital pictorial book system 10 is informed by the informing module 386 and captures an image 510 once more. As described with regard to FIG. 20, the informing module 386 receives information showing a region of a part corresponding to a distinguishing feature of a main object included in the image captured by the image capturing module 100 and displays the image with the region of the part surrounded by a frame. However, in case an image showing the part is not found in the main object by the featuring part searching module 384, the informing unit 386 may inform the user of information showing an image capturing method for capturing an image including the part by using the image capturing module 100.

Here, the information showing the image capturing method may include, for example, information showing the image capturing direction of the image capturing module 100. For example, in case of searching for an explanation of the main object 502, which is a flower, of the captured image 500, suppose that the distinguishing feature selecting module 382 selects a distinguishing feature showing a part, which is a leaf. In this case, since the main object 502 of the image 500 does not include an image showing the part which is a leaf, the featuring part searching module 384 cannot search for an image showing a part corresponding to the distinguishing feature in the main object 502. Further, suppose that the image database 38 stores information showing positional relationships between parts of the object in the present example. Then, the informing module 386 acquires the positional relationships between the leaf, which is the part corresponding to the selected distinguishing feature, and parts of which images are included in the main object 502, for example, a petal and a stamen, from the image database 38. Then, the informing module 386 discovers that the part corresponding to the leaf of the main object 502 is below the range of the captured image 500. The informing module 386 informs the user that the image capturing direction of the image capturing module 100 should be changed downward, for example, by displaying an arrow 504 pointing downward on the display module 50 so that the arrow 504 is overlapped with the image 500. The user is informed of that, changes the image capturing direction downward, and makes the image capturing module 100 capture an image 510. Since the main object 512 included in the image 510 includes the leaf which is the distinguishing feature, the explanation searching module 330 can search an explanation of the main object 512 precisely, on the basis of the distinguishing feature.

Even if a thing which is the main object has a featuring part showing a distinguishing feature which makes the thing clearly distinguished from another thing having similar features with the thing, it cannot be concluded that the user of the digital pictorial book system 10 knows the position of the featuring part. Thus, sometimes a captured image does not include the featuring part. However, according to the digital pictorial book system 10 of the embodiment of the present invention, since it is possible to inform the user of information showing the image capturing method for capturing an image including the featuring part, the user can capture an image in which an explanation of the main object can be searched out with high precision on the basis of the information.

In addition, even if the featuring part is not included within the image capturing range of a captured image, the user can change the image capturing direction to capture an image in which an explanation of the main object can be searched out precisely by being informed of information showing the image capturing direction as the information showing the image capturing method.

Figure 23A:
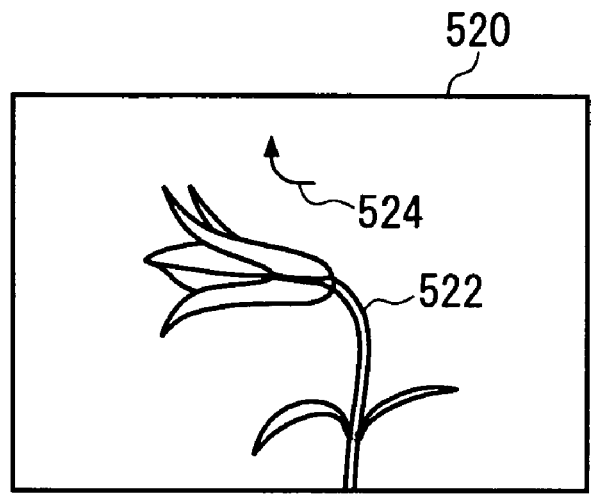
FIGS. 23A and 23B show a second example of the process of informing by the informing module 386 according to the embodiment of the present invention.
Figure 23B:
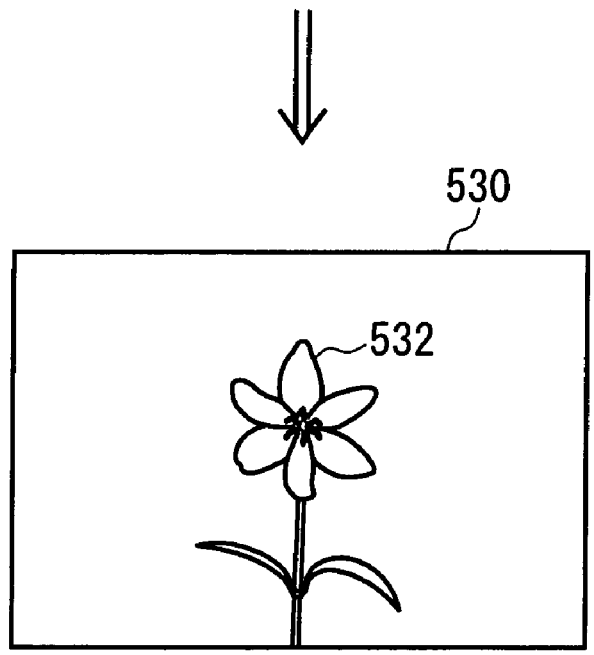

FIG. 23 shows a second example of the process of informing by the informing module 386 according to the present embodiment. According to the present example, after capturing an image 520 and trying to search for an explanation of a main object 522, the user of the digital pictorial book system 10 is informed by the informing module 386 and captures an image 530 once more. In the following, an example will be explained, in which information showing the position of the image capturing module 100 is included in the information of which the informing module 386 informs the user and which shows the image capturing method for capturing an image comprising the featuring part by using the image capturing module 100 in case an image showing the featuring part is not searched out in the main object by the featuring part searching module 384.

For example, in case of searching for an explanation of the main object 522, which is a flower, of the image 520 captured by the digital pictorial book system 10, suppose that the distinguishing feature selecting module 382 selects a part corresponding to a stamen from the main object 522 as a distinguishing feature. In this case, since the main object 522 in the image 520 does not comprise an image showing the part corresponding to the stamen, the featuring part searching module 384 cannot search for an image showing the part corresponding to the distinguishing feature in the main object 522. Further, suppose that the image database 38, in case the object is viewed from a plurality of directions, stores information showing whether or not each part included in the object is shown for each direction and a feature of each part when the object is view from the direction, in the present example. On the basis of the information acquired from the image database 38, the informing module 386 detects the direction in which the main object 522 of the image 520 is captured and the difference between the detected direction and the direction in which an image comprising the stamen can be captured, wherein the stamen is the part corresponding to the selected distinguishing feature. Then, the informing module 386 concludes that an image including the stamen can be captured if an image is captured from the direction of being rotated by 90° in the clockwise direction about the main object 522 as viewed from the above. Then, the informing module 386 informs the user that the image capturing module 100 should be rotated by 90° in the clockwise direction about the main object 522, for example, by displaying an arrow 524 showing rotation of 90° in the clockwise direction on the display module 50 so that the arrow 524 is overlapped with the image 520. The user is informed of that, moves to around the main object in the clockwise direction, and makes the image capturing module 100 capture an image 530. Since the main object 512 included in the image 530 includes the stamen which is the distinguishing feature, the explanation searching module 330 can search an explanation of the main object 532 precisely, on the basis of the distinguishing feature.

Thus, even if the image capturing module 100 captures an image at a place where an image of a distinguishing feature of the main object cannot be captured, the user can change the image capturing position by being informed of information showing the position of the image capturing module 100 as the information showing the image capturing method and capture an image in which an explanation of the main object can be searched out precisely.

Figure 24A:
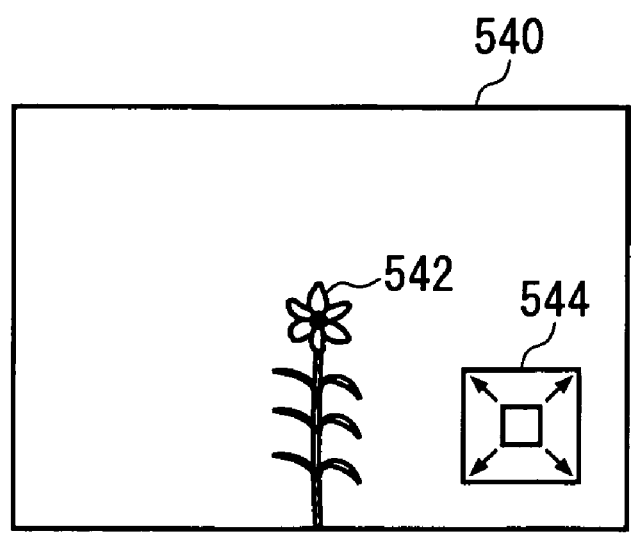
FIGS. 24A and 24B show a third example of the process of informing by the informing module 386 according to the embodiment of the present invention.
Figure 24A:
Figure 24B:
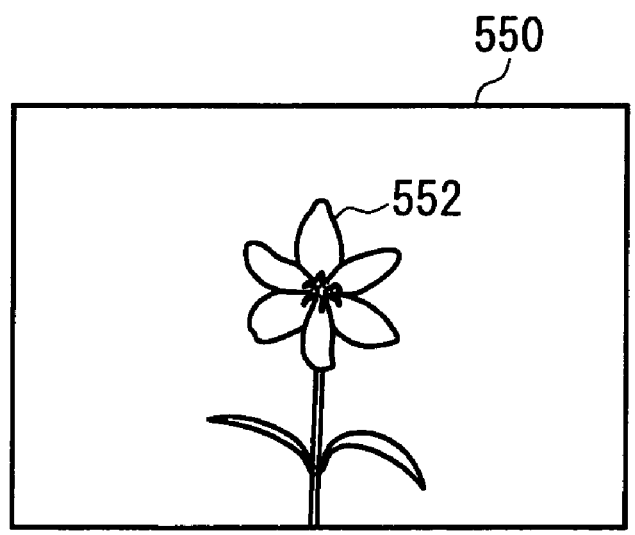

FIG. 24 shows a third example of the process of informing by the informing module 386 according to the present embodiment. According to the present example, after capturing an image 540 and trying to search for an explanation of a main object 542, the user of the digital pictorial book system 10 is informed by the informing module 386 and captures an image 550 once more. In the following, an example will be explained, in which information showing image capturing magnification of the image capturing module 100 is included in the information of which the informing module 386 informs the user and which shows the image capturing method for capturing an image comprising the featuring part by using the image capturing module 100 in case an image showing the featuring part is not searched out in the main object by the featuring part searching module 384.

For example, in case of searching for an explanation of the main object 522, which is a flower, of the image 520 captured by the digital pictorial book system 10, suppose that the distinguishing feature selecting module 382 selects a part corresponding to a stamen from the main object 522 as a distinguishing feature. In this case, the main object 542 in the image 540 comprise an image showing the part corresponding to the stamen, but the size of the image is very small. For this reason, the featuring part searching module 384 cannot search for an image showing the part corresponding to the distinguishing feature in the main object 542. Further, the image database 38 stores information showing positional relationships between parts of the object in the present example, and the informing module 386 acquires information showing the positional relationships between the stamen, which is the part corresponding to the selected distinguishing feature, and a part of which image is included in the main object 542, for example, a petal, from the image database 38. Then, the informing module 386 concludes that the part corresponding to the stamen is in the middle of the petal in the main object 542. The informing module 386 informs the user that an detailed image of the part which is the stamen should be captured by using the image capturing module 100, for example, by displaying an icon image 544 showing increase of the magnification on the display module 50 so that the icon image 544 is overlapped with the image 540. The user is informed of that, increases the image capturing magnification, and makes the image capturing module 100 capture an image 550. Since the main object 552 included in the image 550 comprises the stamen which is the part corresponding to the distinguishing feature and the image of the stamen is so large that the featuring part searching module 384 can search for it, the explanation searching module 330 can search an explanation of the main object 552 precisely, on the basis of the distinguishing feature.

Thus, even if an image showing a featuring part of the main object is too small to be searched out, the user can change the image capturing magnification during capturing an image by being informed of the information showing the image capturing magnification of the image capturing module 100 as the information showing an image capturing method and capture an image in which an explanation of the main object can be searched out precisely.

Further, the information showing the image capturing method of which the informing module 386 informs the user may include diverse information other than the image capturing direction, the position, and the image capturing magnification of the image capturing module 100. For example, the information showing the image capturing method may include information showing capturing conditions such as an exposure time and white balance of the image capturing module 100.

Figure 25:
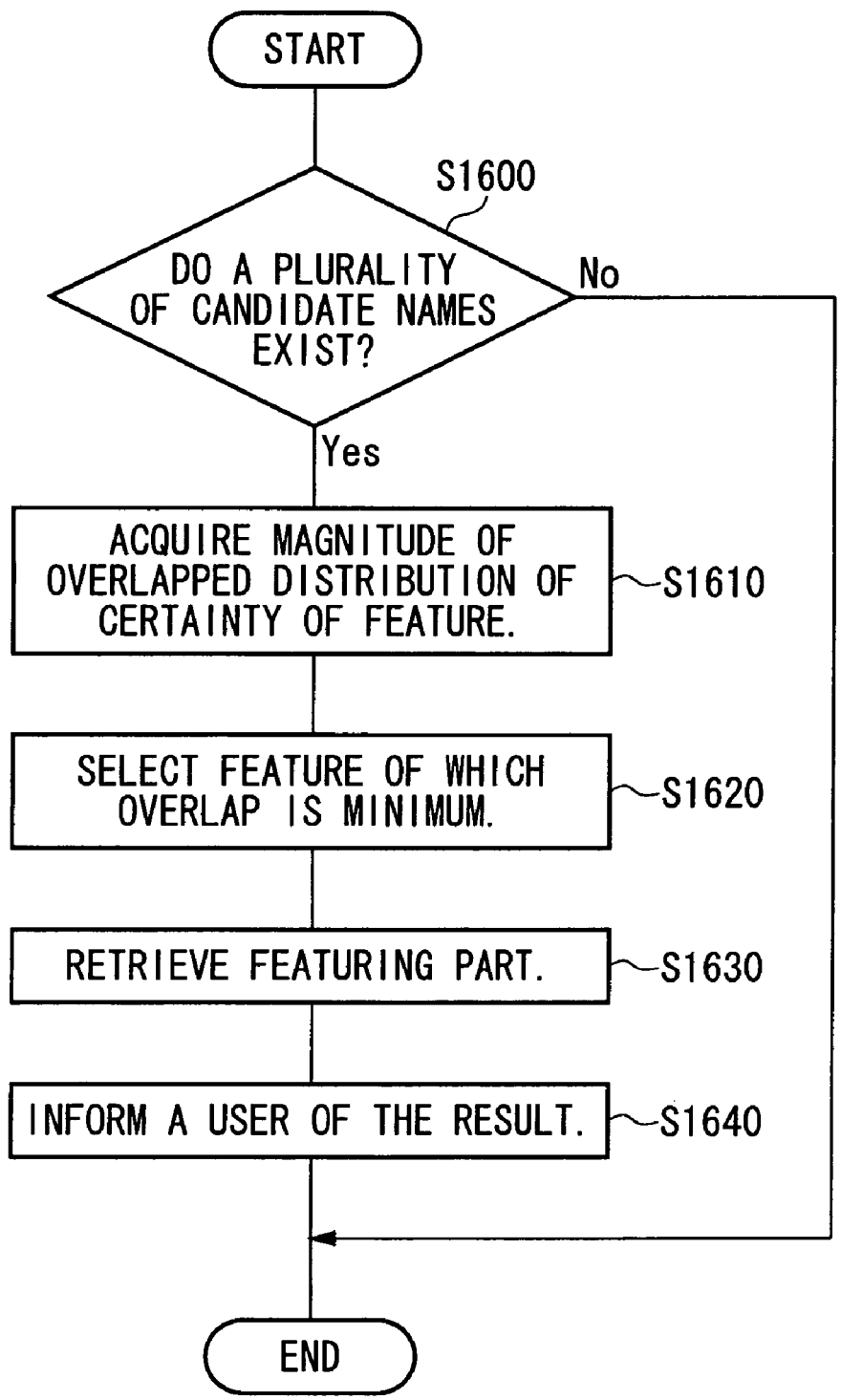
FIG. 25 is a flowchart exemplary showing a process flow by the informing unit 380 according to the embodiment of the present invention.

FIG. 25 is a flowchart to show an example of a process flow by the informing unit 380 according to the present embodiment. The distinguishing feature selecting module 382 determines whether or not a plurality of candidate names are searched out by the candidate name searching module 340 (S1600). In case that a plurality of candidate names are searched out by the candidate name searching module 340 (S1600: Yes), for each of a plurality of features, the distinguishing feature selecting module 382 acquires the size of an overlap of certainty distributions for each combination of all the plurality of objects searched out from the image database 38 (S1610).

Then, the distinguishing feature selecting module 382 selects a distinguishing feature, of which an overlap on certainty distributions is the smallest for each combination of all the plurality of objects searched out (S1620). Here, the distinguishing feature selecting module 382 may select the distinguishing feature on the basis of the sum and the average of the sizes of overlaps. Further, the distinguishing feature selecting module 382 may select the distinguishing feature on the basis of the sum and the average of the sizes of overlaps, each of which has different weight for each combination of the objects.

The featuring part searching module 384 searches for a part showing the distinguishing feature selected by the distinguishing feature selecting module 382 in the image of the main object (S1630). For example, the featuring part searching module 384 searches for a part showing the distinguishing feature in the image of the main object by executing a pattern matching process using a digitized image pattern of each part showing the distinguishing feature for a digitized image of the main object. Then, the informing module 386 informs the user which part of the object to capture by displaying a region showing the part corresponding to the distinguishing feature searched out by the featuring part searching module 384 in the image of the main object so as to be overlapped with the image of the main object on the display module 50 by using the frame display module (S1640).

As described above, according to the digital pictorial book system 10 of the embodiment of the present invention, since it is possible for the user to understand that a part of the object before his/her eyes is the distinguishing feature, the user can execute narrow-down of the candidate names easily and efficiently.

The informing module 386 in FIGS. 20 to 25 displays a frame surrounding a part corresponding the distinguishing feature selected by the distinguishing feature selecting module 382 on the display module 50 to inform the user of the part, or displays an arrow and an icon image showing an image capturing method on the display module 50 to inform the user of the image capturing method. Instead, the informing module 386 may inform the user of the content of the selected distinguishing feature by using a voice. For example, the informing module 386 may retrieve voice data showing the name of the part corresponding to the selected distinguishing feature from the image database 38 and output a voice such as "Please capture an image of the leaf." Which is the voice data showing the name of the part corresponding to the selected distinguishing feature through a voice output module such as a speaker provided in the digital pictorial book system 10. Further, the informing module 386 may inform the user of the image capturing method for capturing an image including the part corresponding to the selected distinguishing feature making use of the image capturing module 100 by using a voice. For example, in case the image 500 shown in FIG. 22 is captured, the informing module 386 may output a voice of "Please capture an image of the lower part." through the voice output module such as a speaker. Thus, since the informing module informs the user information by a voice, even a user of the digital pictorial book system 10, who has little experience in handling electronic devices, can easily understand the content of the information.

Further, instead the informing module 386 informs the user of the information showing the image capturing method of the image capturing module 10 on the basis of the content of the distinguishing feature selected by the distinguishing feature selecting module 382 by the display module 50, the image capture controlling module 120 may control the operation of the image capturing module 100 on the basis of the selected distinguishing feature. Specifically, the image capture controlling module 120 may receive an image, which shows a part corresponding to a distinguishing feature and is searched out by the featuring part searching module 384, and control the operation of the image capturing module 100 on the basis of the information showing the distinguishing feature selected by the distinguishing feature selecting module 382, the received distinguishing feature and image. Thus, it is possible to search for explanation of the main object by automatically controlling the operation of the image capturing module 100 and capturing an image of the selected distinguishing feature or an image including a part corresponding to the distinguishing feature without the user's operating the image capturing apparatus 20 on the basis of the information by the informing module 386.

For example, in case a part corresponding to a distinguishing feature is not searched out in a main object included in an image by the featuring part searching module 384, the image capture controlling module 120 may control the image capturing direction of the image capturing module 100 so that the part is included in the image capturing range. For example, in case the main object 502 included in the captured image 500 does not include a part which is the leaf corresponding to the distinguishing feature as shown in FIG. 22, the image capture controlling module 120 may detect a position of the part which is the leaf and change the image capturing direction of the image capturing module 100 downwardly so that the part which is the leaf is included in the image capturing range similarly to the informing module 386 described with regard to FIG. 22. In this case, the image capture controlling module 120 may control the image capturing direction of the image capturing module 100 by driving an actuator provided in the image capturing module 100, for example, so as to control the direction of the optical axis of the optical system 102. Thus, even if the captured image does not include a part corresponding to a distinguishing feature which is a featuring part of the main object, explanation of the main object can be searched out precisely without imposing a burden on the user because it is possible to automatically control the image capturing direction and capture an image including the part.

Further, for example, in case a part corresponding to a distinguishing feature is not searched out in a main object included in an image by the featuring part searching module 384, the image capture controlling module 120 may control the image capturing range of the image capturing module 100 so that the part is included in the image capturing range. For example, in case the main object 522 included in the captured image 520 does not include a part which is the stamen corresponding to the distinguishing feature as shown in FIG. 23, the image capture controlling module 120 may detect a direction in which an image including the part which is the stamen can be captured and move the image capturing module 100 around the main object 522 by 90° in the clockwise direction as vied from the above so that the part which is the stamen is included in the image capturing range similarly to the informing module 386 described with regard to FIG. 23. Here, at least a part of the digital pictorial book system 10, which includes the image capturing module 100, may be formed mobile by such as a wheel and motor or may be provided in a small helicopter, and the image capture controlling module 120 may control at least a part of place and direction. Thus, even if the user captures an image from a direction in which a distinguishing feature which is a featuring part of the main object cannot be captured, explanation of the main object can be searched out precisely without imposing a burden on the user because it is possible to automatically control the image capturing direction and capture an image including the part.

Furthermore, for example, in case a ratio of the size of an image showing a part corresponding to a distinguishing feature searched out in an image captured by the image capturing module 100 by the featuring part searching module 384 to the whole size of the captured image is smaller than a predetermined value, the image capture controlling module 120 may increase the image capturing magnification of the image capturing module 100 so that the part is included in the image capturing range. For example, the featuring part searching module 384 can search for an image showing a part corresponding to a distinguishing feature on the basis of general features included in the captured image but cannot detect the distinguishing feature detailed enough to narrow a plurality of candidate objects to the main object from the image. Then, in case the ratio of the size of the part of the image which is search out to the whole size of the captured image is smaller than a predetermined value, the image capture controlling module 120 increases the image capturing magnification of the image capturing module 100 more according to the ratio. Further, the predetermined value may be a typical value of a ratio of an image, which shows a part corresponding to a distinguishing feature, to the whole captured image in case the distinguishing feature is detailed enough that the explanation searching module 330 can search for an explanation of the main object with sufficiently high precision and the distinguishing feature can be detected from the captured image, or predetermined by the user. Thus, even if the user cannot capture an image of a featuring of the main object, explanation of the main object can be searched out precisely without imposing a burden on the user by automatically increasing the image capturing magnification of the image capturing module 100 and capturing an image including the part of a sufficiently big size.

The image database 38 may further store dangerous thing information, which shows whether or not the object is a highly dangerous thing, corresponded to a plurality of different kinds of features of the objects. In this case, the informing module may inform the user that the object is a highly dangerous thing by, for example, displaying an expression "Danger" on the display module 50 in case it is shown by the dangerous thing information corresponded to the object of which the explanation and the candidate name are searched out by the explanation searching module 330. Thus, the user can be prevented from coming near an animal or a plant without knowing that the animal or the plant is highly dangerous so as to capture an image which shows a featuring part of the animal or the plant in detail.

As described above, according to the digital pictorial book system 10 of the embodiment of the present invention, the image capturing apparatus 20, the pictorial book processing module 32, and the communicating module may be formed as a single device or may as a plurality of devices connected each other. Further, in case the digital pictorial book system 10 is formed as a single device, the image capturing apparatus 20, which is, for example, a digital still camera or a digital video camera, may include the pictorial book processing module 32 and the communication module 34 explained with regard to FIGS. 10 to 25.

Here, in case of extracting a feature of an object other than the main object, the second feature extracting module 302 shown in FIG. 10 may extract a feature of the object from an image captured at a focal length of a region including the object, which is acquired by the focal length acquiring module 144, out of a plurality of images which the repeatedly capturing module 142 shown in FIG. 2 makes the image capturing module 100 capture while varying the focal length. Thus, since the second feature extracting module 302 can extract a feature of the object from an image which is clear and has a high focusing degree, the digital pictorial book system 10 can search for an explanation of the main object more precisely.

Further, the main object distance acquiring module 146 may acquire the main object distance for each of regions included in the image on the basis of whether or not a feature of the same kind as a feature of the object stored in the image database 38 is included in the region. Thus, in case the usable image database 38 stores only explanation on an object of a predetermined kind, for example, a flower, the main object distance acquiring module 146 can select the object of the predetermined kind included in the captured image, specifically, the object having a feature of the same kind as the feature of the object of the predetermined kind, as the main object. Therefore, in case the user uses the image database 38 related to an object of a predetermined kind so as to search for an explanation of the object of the predetermined kind, it is possible to select an object, of which explanation the user desires to search for, as the main object precisely.

Figure 26:
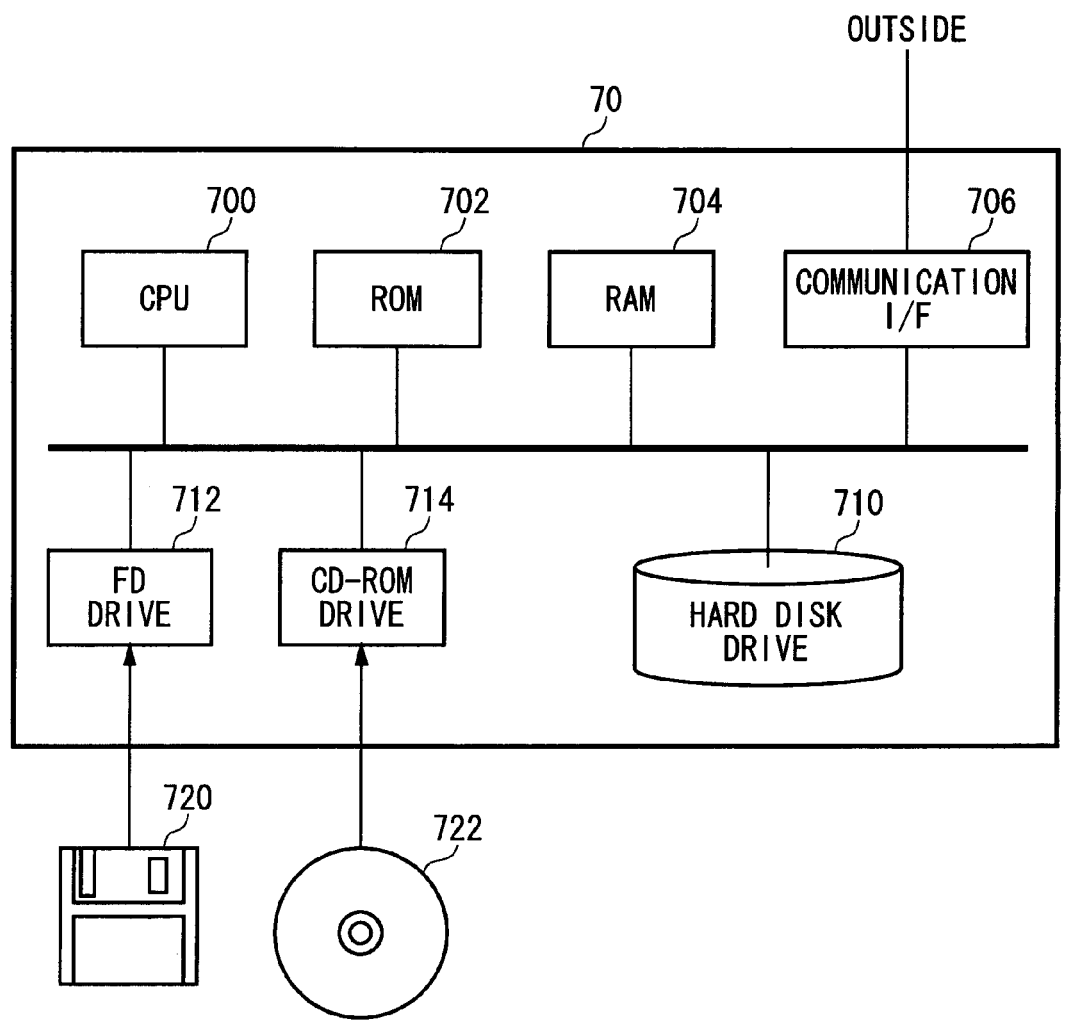
FIG. 26 is a block diagram exemplary showing the hardware configuration of a personal computer 70 performing a function as the digital pictorial book system 10 according to the embodiment of the present invention.

FIG. 26 is a block diagram to show an example of the hardware configuration of a personal computer 70 performing a function as the digital pictorial book system 10 according to the embodiment of the present invention. The personal computer 70 includes a CPU 700, a ROM 702, a RAM 704, a communication interface 706, a hard disk drive 710, a flexible disk drive 712, and a CD-ROM drive 714. The CPU 700 operates based on programs stored in the ROM 702 and the RAM 704 and controls each part of the personal computer 70.

The flexible disk drive 712 retrieves data or a program from a flexible disk 720 and stores them in the RAM 704. The CD-ROM drive 714 retrieves data or a program from a CD-ROM 722 and stores them in the RAM 704.

A program is stored on a recording medium such as the flexible disk 720 or the CD-ROM 722 and provided to the digital pictorial book system 10 by the user. The program stored in the recording medium may be compressed or not. The program is retrieved from the recording medium, installed in the digital pictorial book system 10, and executed in the digital pictorial book system 10. The program, which is provided by the recording medium and installed in the digital pictorial book system 10, executes the functions of the digital pictorial book system 10 described with regard to the FIGS. 1 to 25.

It is possible to store a part or all of the processes of the digital pictorial book system 10 according to the embodiment explained in the present application in the flexible disk 720 or the CD-ROM 722 shown in FIG. 26, which is an example of the recording medium.

The program may be directly retrieved from the recording medium and executed by the digital pictorial book system 10, or may be executed after being installed in the digital pictorial book system 10. Further, the program may be stored in one or a plurality of recording medium(s). Furthermore, the program may be stored in an encoded form.

An optical recoding medium such as DVD, PD, etc., a magneto-optical recording medium such as MD, a tape medium, a magnetic recoding medium, a semiconductor memory such as an IC card, and a miniature card can be used as a recoding medium in addition to the flexible disk and the CD-ROM. Further, a storing apparatus such as a hard disk or a RAM provided in a server system connected with a dedicated communication network and the Internet may be used as the recording medium and provide the digital pictorial book system with the program through a communication network.

According to the present invention, in case of executing search by using a plurality of image database, it is possible to obtain a search result with high precision and efficiently.

Although the present invention has been described by way of exemplary embodiments, it should be understood that those skilled in the art might make many changes and substitutions without departing from the spirit and the scope of the present invention which is defined only by the appended claims.

What is claimed is:

1. An image capturing apparatus comprising:
    an image capturing module for capturing an image, said image capturing module comprising an optical system that varies a focal length which is a distance from the image capturing apparatus to a focused object;
    a display module for displaying the captured image captured by said image capturing module;
    a main object selecting module for selecting a main object in the captured image, said main object selecting module comprising:
        a repeatedly capturing module for capturing the image repeatedly while said optical system varies the focal length;
        a focal length acquiring module for acquiring a focal length at which a best focused image can be taken for each region comprised in the image on the basis of the image captured by said repeatedly capturing module;
        a main object distance acquiring module for acquiring a main object distance, which is a distance to the main object, on the basis of each focal length of each region acquired by said focal length acquiring module; and
        a region selecting module for selecting a region apart by the main object distance in the image; and
    a frame display module for displaying a frame, which surrounds the main object, over the captured image on the display module, said frame surrounding the region selected by said region selecting module;
    wherein said main object distance acquiring module acquires a focal length for which a value of a sum multiplied by a distance weight of each focal length is the biggest as the main object distance, the sum having a value of a sum of areas of regions having the same focal lengths multiplied by predetermined weights of regions, respectively.

2. The image capturing apparatus as claimed in claim 1, wherein said frame display module displays a frame in the neighborhood of and around the circumference of the main object.

3. The image capturing apparatus as claimed in claim 1 further comprising a variation operation module for varying the main object distance, wherein
    said region selection module selects again a region apart by the varied main object distance in case the main object distance is varied, and
    said frame display module displays a frame surrounding the region selected again by said region selecting module.

4. The image capturing apparatus as claimed in claim 3 further comprising an automatic focusing module for focusing on a point at the main object distance varied by said variation operation module.

5. The image capturing apparatus as claimed in claim 3 further comprising an exposure selecting module for selecting a degree of exposure of the image with a larger weight on a region selected by said region selecting module than other region.

6. The image capturing apparatus as claimed in claim 3 further comprising a white balance setting module for setting a white balance of the image with a larger weight on a region selected by said region selecting module than other region.

7. The image capturing apparatus as claimed in claim 1, wherein said focal length acquiring module controls a division method for dividing the image into a plurality of regions on the basis of the image capturing mode predetermined by a user.

8. The image capturing apparatus as claimed in claim 1 further comprising:
    a feature extracting module for extracting a feature of the main object; and
    an explanation searching module for searching for an explanation of the main object by using the feature extracted by said feature extracting module from an image database storing the explanation of the object corresponding to the feature of the object.

9. The image capturing apparatus as claimed in claim 8, wherein said main object distance acquiring module acquires the main object distance on the further basis of a determination result on whether or not the same kind of feature stored in the image database is comprised in each region comprised in the image.

10. The image capturing apparatus as claimed in claim 8 further comprising a second feature extracting module for extracting a feature of an object other than the main object out of the image, wherein said explanation searching module searches for the explanation of the main object by further using the feature of the object other than the main object extracted by said second feature extracting module in the image database storing the explanation of the object further corresponded to the feature of a thing related highly to the object.

11. The image capturing apparatus as claimed in claim 10, wherein said second feature extracting module extracts the feature of the object from the image captured at the focal length of the region, in which the object is comprised, acquired by said focal length acquiring module out of the plurality of images captured repeatedly by said repeatedly capturing module while varying the focal length, in case the feature of the object other than the main object is extracted.

12. The image capturing apparatus as claimed in claim 10 further comprising annexed information acquiring module for acquiring annexed information annexed to the image, wherein said explanation searching module searches for the explanation of the main object by further using the annexed information gotten by said annexed information acquiring module from the image database storing the explanation of the object further corresponded to the annexed information annexed to the object.

13. An image capturing method for an image capturing apparatus comprising:
   capturing an image with an optical system that varies a focal length which is a distance from the image capturing apparatus to a focused object;
   displaying the captured image captured in said image capturing;
   selecting a main object in the captured image, said selecting comprising:
      repeatedly capturing the image while the focal length varies in said image capturing;
      acquiring a focal length at which a best focused image can be taken for each region comprised in the image on the basis of the image captured in said repeatedly image capturing;
      acquiring a main object distance, which is a distance to the main object, on the basis of each focal length of each region acquired in said focal length acquiring; and
      selecting a region apart by the main object distance in the image; and
   displaying a frame, which surrounds the main object, over the captured image, said frame surrounding the region selected in said region selecting;
   wherein, during said main object distance acquiring, a focal length for which a value of a sum multiplied by a distance weight of each focal length is the biggest as the main object distance, the sum having a value of a sum of areas of regions having the same focal lengths multiplied by predetermined weights of regions, respectively, is acquired.

14. A machine readable medium storing thereon an image capturing program making an image capturing apparatus perform image capturing operation, said image capturing apparatus comprising:
   an image capturing module for capturing an image, said image capturing module comprising an optical system that varies a focal length which is a distance from said image capturing module to a focused object;
   a display module for displaying the captured image captured by said image capturing module;
   a main object selecting module for selecting a main object in the captured image, said main object selecting module comprising:
      a repeatedly capturing module for capturing the image repeatedly while said optical system varies the focal length;
      a focal length acquiring module for acquiring a focal length at which a best focused image can be captured for each region comprised in the image on the basis of the image captured by said repeatedly capturing module;
      a main object distance acquiring module for acquiring a main object distance, which is a distance to the main object, on the basis of each focal length of each region acquired by said focal length acquiring module; and
      a region selecting module for selecting a region apart by the main object distance in the image; and
   a frame display module for displaying a frame, which surrounds the main object, over the captured image on the display module, said frame surrounding the region selected by said region selecting module;
   wherein said main object distance acquiring module acquires a focal length for which a value of a sum multiplied by a distance weight of each focal length is the biggest as the main object distance, the sum having a value of a sum of areas of regions having the same focal lengths multiplied by predetermined weights of regions, respectively.

15. An image capturing apparatus comprising:
   an image capturing module for capturing an image, said image capturing module comprising an optical system that varies a focal length which is a distance from the image capturing apparatus to a focused object;
   a display module for displaying the captured image captured by said image capturing module;
   a main object selecting module for selecting a main object in the captured image, said main object selecting module comprising:
      a repeatedly capturing module for capturing the image repeatedly while said optical system varies the focal length;
      a focal length acquiring module for acquiring a focal length at which a best focused image can be taken for each region comprised in the image on the basis of the image captured by said repeatedly capturing module;
      a main object distance acquiring module for acquiring a main object distance, which is a distance to the main object, on the basis of each focal length of each region acquired by said focal length acquiring module; and
      a region selecting module for selecting a region apart by the main object distance in the image;
   a frame display module for displaying a frame, which surrounds the main object, over the captured image on the display module, said frame surrounding the region selected by said region selecting module;
   a feature extracting module for extracting a feature of the main object;
   an explanation searching module for searching for an explanation of the main object by using the feature extracted by said feature extracting module from an image database storing the explanation of the object corresponding to the feature of the object; and
   a second feature extracting module for extracting a feature of an object other than the main object out of the image, wherein said explanation searching module searches for the explanation of the main object by further using the feature of the object other than the main object extracted by said second feature extracting module in the image database storing the explanation of the object further corresponded to the feature of a thing related highly to the object.

16. The image capturing apparatus as claimed in claim 15, wherein said second feature extracting module extracts the feature of the object from the image captured at the focal length of the region, in which the object is comprised, acquired by said focal length acquiring module out of the plurality of images captured repeatedly by said repeatedly capturing module while varying the focal length, in case the feature of the object other than the main object is extracted.

17. The image capturing apparatus as claimed in claim 15 further comprising annexed information acquiring module for acquiring annexed information annexed to the image, wherein said explanation searching module searches for the explanation of the main object by further using the annexed information gotten by said annexed information acquiring module from the image database storing the explanation of the object further corresponded to the annexed information annexed to the object.

18. An image capturing apparatus comprising:
an image capturing module for capturing an image, said image capturing module comprising an optical system that varies a focal length which is a distance from the image capturing apparatus to a focused object;
a display module for displaying the captured image captured by said image capturing module;
a main object selecting module for selecting a main object in the captured image, said main object selecting module comprising:
  a repeatedly capturing module for capturing the image repeatedly while said optical system varies the focal length;
  a focal length acquiring module for acquiring a focal length at which a best focused image can be taken for each region comprised in the image on the basis of the image captured by said repeatedly capturing module;
  a main object distance acquiring module for acquiring a main object distance, which is a distance to the main object, on the basis of each focal length of each region acquired by said focal length acquiring module; and
  a region selecting module for selecting a region apart by the main object distance in the image;
a frame display module for displaying a frame, which surrounds the main object, over the captured image on the display module, said frame surrounding the region selected by said region selecting module;
a feature extracting module for extracting a feature of the main object; and
an explanation searching module for searching for an explanation of the main object by using the feature extracted by said feature extracting module from an image database storing the explanation of the object corresponding to the feature of the object;
wherein said main object distance acquiring module acquires the main object distance on the further basis of a determination result on whether or not the same kind of feature stored in the image database is comprised in each region comprised in the image.

19. An image capturing apparatus comprising:
an image capturing module for capturing an image, said image capturing module comprising an optical system that varies a focal length which is a distance from the image capturing apparatus to a focused object;
a display module for displaying the captured image captured by said image capturing module;
a main object selecting module for selecting a main object in the captured image, said main object selecting module comprising:
  a repeatedly capturing module for capturing the image repeatedly while said optical system varies the focal length;
  a focal length acquiring module for acquiring a focal length at which a best focused image can be taken for each region comprised in the image on the basis of the image captured by said repeatedly capturing module;
  a main object distance acquiring module for acquiring a main object distance, which is a distance to the main object, on the basis of each focal length of each region acquired by said focal length acquiring module; and
  a region selecting module for selecting a region apart by the main object distance in the image; and
a frame display module for displaying a frame, which surrounds the main object, over the captured image on the display module, said frame surrounding the region selected by said region selecting module;
wherein said focal length acquiring module controls a division method for dividing the image into a plurality of regions on the basis of the image capturing mode predetermined by a user.

* * * * *